United States Patent

(12) United States Patent
Balasubramanian et al.

(10) Patent No.: US 11,825,313 B2
(45) Date of Patent: Nov. 21, 2023

(54) MEASUREMENT REPORTS BASED ON SENSING CAPABILITIES

(71) Applicant: QUALCOMM Incorporated, San Diego, CA (US)

(72) Inventors: Anantharaman Balasubramanian, San Diego, CA (US); Kyle Chi Guan, New York, NY (US); Kapil Gulati, Belle Mead, NJ (US); Himaja Kesavareddigari, Bridgewater, NJ (US); Chang-Sik Choi, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/365,130

(22) Filed: Jul. 1, 2021

(65) Prior Publication Data

US 2023/0007503 A1 Jan. 5, 2023

(51) Int. Cl.
*H04W 16/28* (2009.01)
*H04W 24/10* (2009.01)
*H04W 8/24* (2009.01)
*H04W 68/00* (2009.01)

(52) U.S. Cl.
CPC ............ *H04W 16/28* (2013.01); *H04W 8/24* (2013.01); *H04W 24/10* (2013.01); *H04W 68/005* (2013.01)

(58) Field of Classification Search
CPC ....... H04W 16/28; H04W 8/24; H04W 24/10; H04W 68/005; H04W 92/18
See application file for complete search history.

(56) References Cited

U.S. PATENT DOCUMENTS

| 2017/0094716 A1* | 3/2017 | Pogorelik | ............... H04L 67/12 |
| 2022/0155435 A1* | 5/2022 | Bayesteh | ............... H04W 24/10 |
| 2023/0007453 A1* | 1/2023 | Higuchi | ............... H04L 41/0893 |

* cited by examiner

*Primary Examiner* — Ayaz R Sheikh
*Assistant Examiner* — David Zhijun Sun
(74) *Attorney, Agent, or Firm* — Holland & Hart LLP

(57) ABSTRACT

Methods, systems, and devices for wireless communications are described. A base station may transmit a request for a first user equipment (UE) to provide sensing capability information associated with UEs other than the first UE (e.g., an indication of one or more sensors associated with the corresponding UE, an orientation of the corresponding UE, a field of view associated with the corresponding UE). Additionally, the first UE may receive, from each of a set of second UEs, indications of the sensing capability information associated with the corresponding second UEs. Based on the sensing capability information indicated for each of the set of second UEs, the first UE select a subset of second UEs and transmit an indication of the sensing capability information associated with the subset of second UEs to the base station.

30 Claims, 18 Drawing Sheets

MEASUREMENT REPORTS BASED ON SENSING CAPABILITIES

FIELD OF TECHNOLOGY

The following relates to wireless communications, including generation and transmission of measurement reports based on sensing capabilities.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support generation and transmission of measurement reports based on sensing capabilities. Generally, the described techniques provide for a first user equipment (UE) to indicate, to a base station, sensing capability information associated with one or more other UEs. For example, the base station may request for the first UE to indicate the sensor capability information associated with UEs other than the first UE. Additionally, the first UE may receive, from each of the one or more other UEs, an indication of the sensing capability information associated with the corresponding one or more other UEs (e.g., via basic safety messages (BSMs)). In response to receiving the request for the sensing capability information from the base station, the first UE may transmit an indication of the sensing capability information associated with one or more other UEs. Additionally, the base station may request sensing measurement reports from a subset of the one or more other UEs based on the indicated sensing capability information. For example, the base station may transmit, to each of the subset of UEs, a request for the respective UE to generate a sensing measurement report. The base station may then receive the respective sensing measurement reports in response to transmitting the request.

A method for wireless communication at a first user equipment (UE) is described. The method may include receiving, from a base station, a request for the first UE to provide sensing capability information associated with UEs other than the first UE, receiving, from each of a set of multiple second UEs, respective first indications of the sensing capability information associated with corresponding second UEs, selecting one or more second UEs from the set of multiple second UEs based on the respective first indications of the sensing capability information, and transmitting, to the base station in response to the request, a second indication of the sensing capability information associated with the one or more second UEs.

An apparatus for wireless communication at a first UE is described. The apparatus may include a processor, memory coupled with the processor, and instructions stored in the memory. The instructions may be executable by the processor to cause the apparatus to receive, from a base station, a request for the first UE to provide sensing capability information associated with UEs other than the first UE, receive, from each of a set of multiple second UEs, respective first indications of the sensing capability information associated with corresponding second UEs, select one or more second UEs from the set of multiple second UEs based on the respective first indications of the sensing capability information, and transmit, to the base station in response to the request, a second indication of the sensing capability information associated with the one or more second UEs.

Another apparatus for wireless communication at a first UE is described. The apparatus may include means for receiving, from a base station, a request for the first UE to provide sensing capability information associated with UEs other than the first UE, means for receiving, from each of a set of multiple second UEs, respective first indications of the sensing capability information associated with corresponding second UEs, means for selecting one or more second UEs from the set of multiple second UEs based on the respective first indications of the sensing capability information, and means for transmitting, to the base station in response to the request, a second indication of the sensing capability information associated with the one or more second UEs.

A non-transitory computer-readable medium storing code for wireless communication at a first UE is described. The code may include instructions executable by a processor to receive, from a base station, a request for the first UE to provide sensing capability information associated with UEs other than the first UE, receive, from each of a set of multiple second UEs, respective first indications of the sensing capability information associated with corresponding second UEs, select one or more second UEs from the set of multiple second UEs based on the respective first indications of the sensing capability information, and transmit, to the base station in response to the request, a second indication of the sensing capability information associated with the one or more second UEs.

In some examples of the method, apparatuses, and non-transitory computer-readable medium described herein, receiving the respective first indications of the sensing capability information may include operations, features, means, or instructions for receiving, from each of the set of multiple second UEs, respective basic safety messages including the sensing capability information associated with the corresponding second UEs.

Some examples of the method, apparatuses, and non-transitory computer-readable medium described herein may further include operations, features, means, or instructions for receiving, from the base station, a set of multiple reporting parameters pertaining to at least one of a number of the one or more second UEs whose sensing capability information may be to be included in the second indication or a nature of the sensing capability information to be included in the second indication, where transmitting the second indication may be based on the set of multiple reporting parameters.

In some examples of the method, apparatuses, and non-transitory computer-readable medium described herein, values of the set of multiple reporting parameters may be based on a geographical zone of the first UE, a mobility of the first UE, or a combination thereof.

In some examples of the method, apparatuses, and non-transitory computer-readable medium described herein, receiving the set of multiple reporting parameters may include operations, features, means, or instructions for receiving one or more of the set of multiple reporting parameters that pertain to the nature of the sensing capability information to be included in the second indication and which specify that the nature of the sensing capability information may be at least one of raw information, meta information, information of a specified resolution quality, images, or point clouds.

In some examples of the method, apparatuses, and non-transitory computer-readable medium described herein, selecting the one or more second UEs may include operations, features, means, or instructions for selecting the one or more second UEs from the set of multiple second UEs based on the one or more second UEs being associated with a sensing capability.

Some examples of the method, apparatuses, and non-transitory computer-readable medium described herein may further include operations, features, means, or instructions for receiving, from the base station based on transmitting the second indication, a third indication to switch from a first beam for communications between the base station and the first UE to a second beam for the communications between the base station and the first UE.

In some examples of the method, apparatuses, and non-transitory computer-readable medium described herein, transmitting the second indication may include operations, features, means, or instructions for transmitting a shortened-temporary mobile subscriber identity associated with the one or more second UEs, a sidelink layer-2 identifier associated with the one or more second UEs, or a combination thereof.

In some examples of the method, apparatuses, and non-transitory computer-readable medium described herein, the sensing capability information includes an indication of one or more sensors associated with the corresponding second UEs, an orientation of the corresponding second UEs, a field of view associated with the corresponding second UEs, or a combination thereof.

A method for wireless communication at a base station is described. The method may include transmitting, to a first UE, a first request for the first UE to provide sensing capability information associated with UEs other than the first UE, receiving, from the first UE and responsive to the first request, an indication of the sensing capability information associated with one or more second UEs, transmitting, to each of the one or more second UEs, a second request for the one or more second UEs to generate respective sensing measurement reports, and receiving, from the one or more second UEs and in accordance with the second request, the respective sensing measurement reports.

An apparatus for wireless communication at a base station is described. The apparatus may include a processor, memory coupled with the processor, and instructions stored in the memory. The instructions may be executable by the processor to cause the apparatus to transmit, to a first UE, a first request for the first UE to provide sensing capability information associated with UEs other than the first UE, receive, from the first UE and responsive to the first request, an indication of the sensing capability information associated with one or more second UEs, transmit, to each of the one or more second UEs, a second request for the one or more second UEs to generate respective sensing measurement reports, and receive, from the one or more second UEs and in accordance with the second request, the respective sensing measurement reports.

Another apparatus for wireless communication at a base station is described. The apparatus may include means for transmitting, to a first UE, a first request for the first UE to provide sensing capability information associated with UEs other than the first UE, means for receiving, from the first UE and responsive to the first request, an indication of the sensing capability information associated with one or more second UEs, means for transmitting, to each of the one or more second UEs, a second request for the one or more second UEs to generate respective sensing measurement reports, and means for receiving, from the one or more second UEs and in accordance with the second request, the respective sensing measurement reports.

A non-transitory computer-readable medium storing code for wireless communication at a base station is described. The code may include instructions executable by a processor to transmit, to a first UE, a first request for the first UE to provide sensing capability information associated with UEs other than the first UE, receive, from the first UE and responsive to the first request, an indication of the sensing capability information associated with one or more second UEs, transmit, to each of the one or more second UEs, a second request for the one or more second UEs to generate respective sensing measurement reports, and receive, from the one or more second UEs and in accordance with the second request, the respective sensing measurement reports.

Some examples of the method, apparatuses, and non-transitory computer-readable medium described herein may further include operations, features, means, or instructions for performing, based on receiving the indication of the sensing capability information, a paging procedure with each of the one or more second UEs to transition each of the one or more second UEs from an inactive mode to a connected mode, where transmitting the second request to each of the one or more second UEs may be based on performing the paging procedure.

Some examples of the method, apparatuses, and non-transitory computer-readable medium described herein may further include operations, features, means, or instructions for transmitting, to each of the one or more second UEs, a paging message including a shortened-temporary mobile subscriber identity associated with respective one or more second UEs or an identifier associated with the respective one or more second UEs determined based on a mapping between sidelinks and communication links between the base station and the respective one or more second UEs.

Some examples of the method, apparatuses, and non-transitory computer-readable medium described herein may further include operations, features, means, or instructions for transmitting, to a mobility management entity, a third request to initiate the paging procedure with each of the one or more second UEs, where performing the paging procedure may be based on transmitting the third request.

Some examples of the method, apparatuses, and non-transitory computer-readable medium described herein may further include operations, features, means, or instructions for transmitting, to the UEs other than the first UE, one or more second indications that may be indicative of a set of multiple configurations for generating sensing measurement reports and transmitting, to each of the one or more second UEs, a paging message indicating one of the set of multiple configurations for generating the respective sensing measurement reports, where receiving the respective sensing measurement reports may be based on transmitting the paging message.

Some examples of the method, apparatuses, and non-transitory computer-readable medium described herein may further include operations, features, means, or instructions for identifying the one of the set of multiple configurations for generating the respective sensing measurement reports based on a mobility of the first UE.

Some examples of the method, apparatuses, and non-transitory computer-readable medium described herein may further include operations, features, means, or instructions for transmitting the first request for the first UE to provide sensing capability information may be based on a mobility of the first UE.

Some examples of the method, apparatuses, and non-transitory computer-readable medium described herein may further include operations, features, means, or instructions for transmitting, to the first UE, a set of multiple reporting parameters pertaining to at least one of a number of the one or more second UEs whose sensing capability information may be to be included in the indication or a nature of the sensing capability information to be included in the indication, where receiving the indication may be based on transmitting the set of multiple reporting parameters.

In some examples of the method, apparatuses, and non-transitory computer-readable medium described herein, values of the set of multiple reporting parameters may be based on a geographical zone of the first UE, a mobility of the first UE, or a combination thereof.

In some examples of the method, apparatuses, and non-transitory computer-readable medium described herein, transmitting the set of multiple reporting parameters may include operations, features, means, or instructions for transmitting one or more of the set of multiple reporting parameters that pertain to the nature of the sensing capability information to be included in the indication and which specify that the nature of the sensing capability information may be at least one of raw information, meta information, information of a specified resolution quality, images, or point clouds.

In some examples of the method, apparatuses, and non-transitory computer-readable medium described herein, the sensing capability information includes a second indication of one or more sensors associated with the one or more second UEs, an orientation of the one or more second UEs, a field of view associated with the one or more second UEs, or a combination thereof.

Some examples of the method, apparatuses, and non-transitory computer-readable medium described herein may further include operations, features, means, or instructions for transmitting, to the first UE based on receiving the respective sensing measurement reports, a second indication to switch from a first beam for communications between the base station and the first UE to a second beam for the communications between the base station and the first UE.

In some examples of the method, apparatuses, and non-transitory computer-readable medium described herein, receiving the indication may include operations, features, means, or instructions for receiving a shortened-temporary mobile subscriber identity associated with the one or more second UEs, a sidelink layer-2 identifier associated with the one or more second UEs, or a combination thereof.

DETAILED DESCRIPTION

Figure 1:
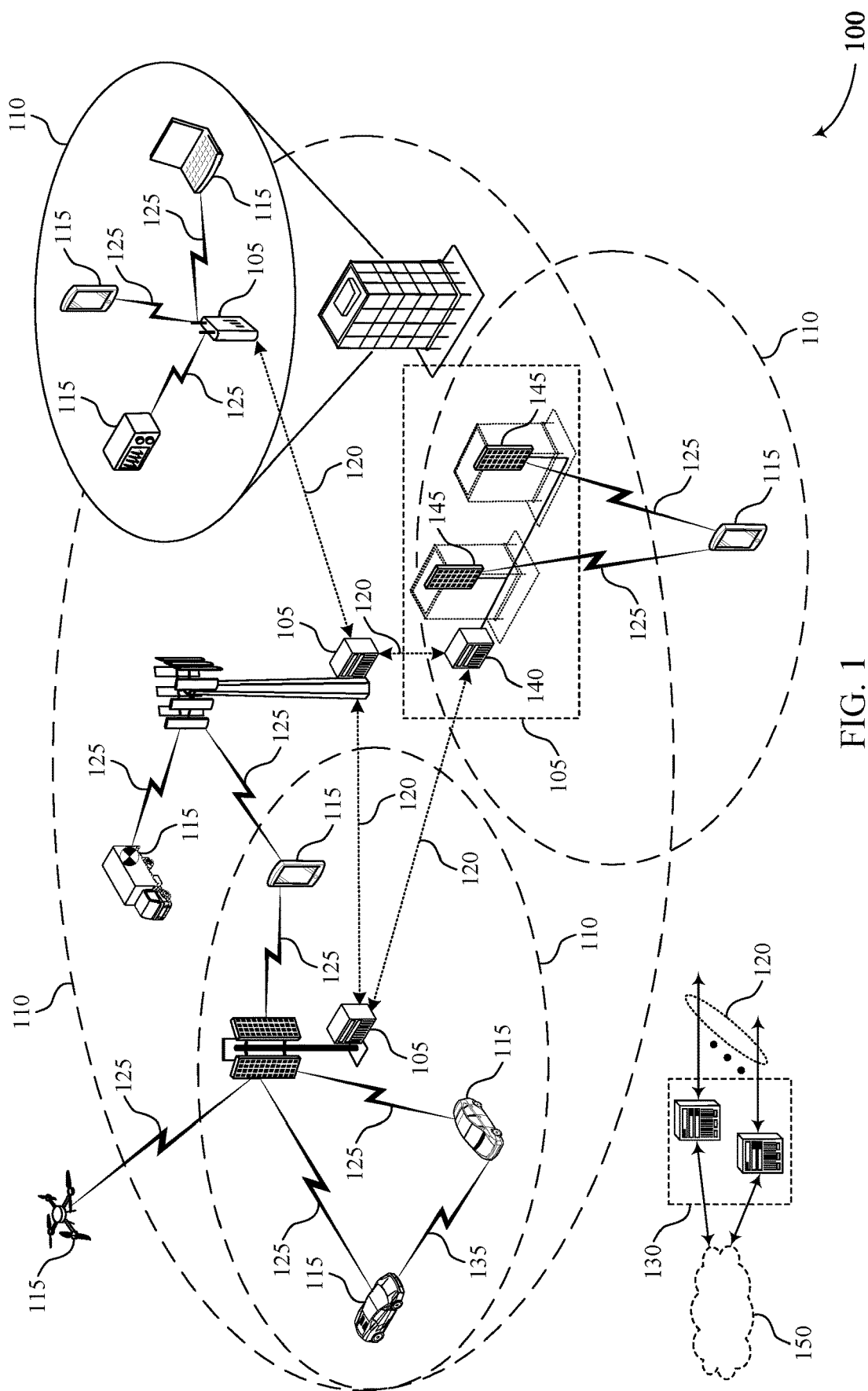
FIGS. 1 through 3 illustrates an example of a wireless communications system that supports generation and transmission of measurement reports based on sensing capabilities in accordance with aspects of the present disclosure.

In some wireless communications systems, user equipments (UEs) may rely on sensor sharing to enable a UE to maintain a situational awareness (e.g., to sense nearby objects such us buildings, trees, other UEs, pedestrians). For example, a first UE may rely on sensor information from one or more sensors (e.g., lidar, radar, camera) at the first UE in addition to sensor information received from other UEs for situational awareness. In some cases, relying on a large quantity of sensors (e.g., at the first UE and at the other UEs) for situational awareness may result in high power consumption at the first UE and the other UEs. Additionally, relying on a subset of sensors may result in a decrease of situational awareness. For example, the first UE may be more likely to experience unreliable communications with a base station or be unaware of nearby objects in cases where the first UE relies on a subset of sensors for situational awareness (e.g., when the first UE does not receive sensor information from other UEs).

In some cases, however, a base station may selectively receive sensor sharing data from UEs based on sensor capability information associated with a first UE and each of the UEs to support effective sensor sharing while decreasing power consumption at one or more of the UEs. For example, the base station may transmit a request for the first UE to indicate the sensor capability information (e.g., an indication of one or more sensors associated with the corresponding UE, an orientation of the corresponding UE, a field of view associated with the corresponding UE) associated with UEs other than the first UE. Additionally, the first UE may receive, from each of the one or more other UEs, an indication of the sensing capability information associated with the corresponding one or more other UEs (e.g., via basic safety messages (BSMs)). In response to receiving the request for the sensing capability information from the base station, the first UE may transmit an indication of the sensing capability information associated with one or more other UEs.

The base station may request sensing measurement reports from a subset of the one or more other UEs based on the indicated sensing capability information. That is, based on a mobility of the first UE or a location of the first UE, the base station may request sensor data for sensor sharing from the subset of UEs (e.g., that have sensor capability information that may provide valuable data for situational awareness at the first UE). For example, the base station may transmit, to each of the subset of UEs, a request for the respective UE to generate a sensing measurement report. The base station may then receive the respective sensing measurement reports in response to transmitting the request. Here, one or more of the other UEs may refrain from transmitting sensor measurement reports to the base station (e.g., in cases that the base station does not request a sensor measurement report from the UE), thus resulting in a decreased power consumption. In this way, the first UE may still receive data associated with sensor sharing in cases where high situational awareness is useful (e.g., in higher mobility, in crowded locations) and may additionally conserve power in cases where less situational awareness is appropriate (e.g., in lower mobility, in less crowded locations).

Aspects of the disclosure are initially described in the context of wireless communications systems. Aspects of the disclosure are further illustrated by and described with reference to a process flow, apparatus diagrams, system diagrams, and flowcharts that relate to generation and transmission of measurement reports based on sensing capabilities.

FIG. 1 illustrates an example of a wireless communications system 100 that supports generation and transmission of measurement reports based on sensing capabilities in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, sensor measurement reports, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems 100, UEs 115 may rely on sensor sharing to enable a UE 115 to maintain a situational awareness (e.g., to sense nearby objects such as buildings, trees, other UEs 115, pedestrians). For example, a first UE 115 may rely on sensor information from one or more sensors (e.g., lidar, radar, camera) at the first UE 115 in addition to sensor information received from other UEs 115 for situational awareness. In some cases, relying on a large quantity of sensors (e.g., at the first UE 115 and at the other UEs 115) for situational awareness may result in high power consumption at the first UE 115 and the other UEs 115. Additionally, relying on a subset of sensors may result in a decrease of situational awareness. For example, the first UE 115 may be more likely to experience unreliable communications with a base station 105 or be unaware of nearby objects in cases where the first UE 115 relies on a subset of sensors for situational awareness (e.g., when the first UE 115 does not receive sensor information from other UEs 115).

In some cases, however, a base station 105 may selectively receive sensor sharing data from UEs 115 based on sensor capability information associated with a first UE 115 and each of the UEs 115 to support effective sensor sharing while decreasing power consumption at one or more of the UEs 115. For example, the base station 105 may transmit a request for the first UE 115 to indicate the sensor capability information (e.g., an indication of one or more sensors associated with the corresponding UE 115, an orientation of the corresponding UE 115, a field of view associated with the corresponding UE 115) associated with UEs 115 other than the first UE 115. Additionally, the first UE 115 may receive, from each of the one or more other UEs 115, an indication of the sensing capability information associated with the corresponding one or more other UEs 115 (e.g., via BSMs). In response to receiving the request for the sensing capability information from the base station 105, the first UE 115 may transmit an indication of the sensing capability information associated with one or more other UEs 115.

The base station 105 may request sensing measurement reports from a subset of the one or more other UEs 115 based on the indicated sensing capability information. That is, based on a mobility of the first UE 115 or a location of the first UE 115, the base station 105 may request sensor data for sensor sharing from the subset of UEs 115 (e.g., that have sensor capability information that may provide valuable data for situational awareness at the first UE 115). For example, the base station 105 may transmit, to each of the subset of UEs 115, a request for the respective UE 115 to generate a sensing measurement report. The base station 105 may then receive the respective sensing measurement reports in response to transmitting the request. Here, one or more of the other UEs 115 may refrain from transmitting sensor measurement reports to the base station 105 (e.g., in cases that the base station 105 does not request a sensor measurement report from the UE 115), thus resulting in a decreased power consumption. In this way, the first UE 115 may still receive data associated with sensor sharing in cases where high situational awareness is useful (e.g., in higher mobility, in crowded locations) and may additionally conserve power in cases where less situational awareness is appropriate (e.g., in lower mobility, in less crowded locations).

Figure 2:
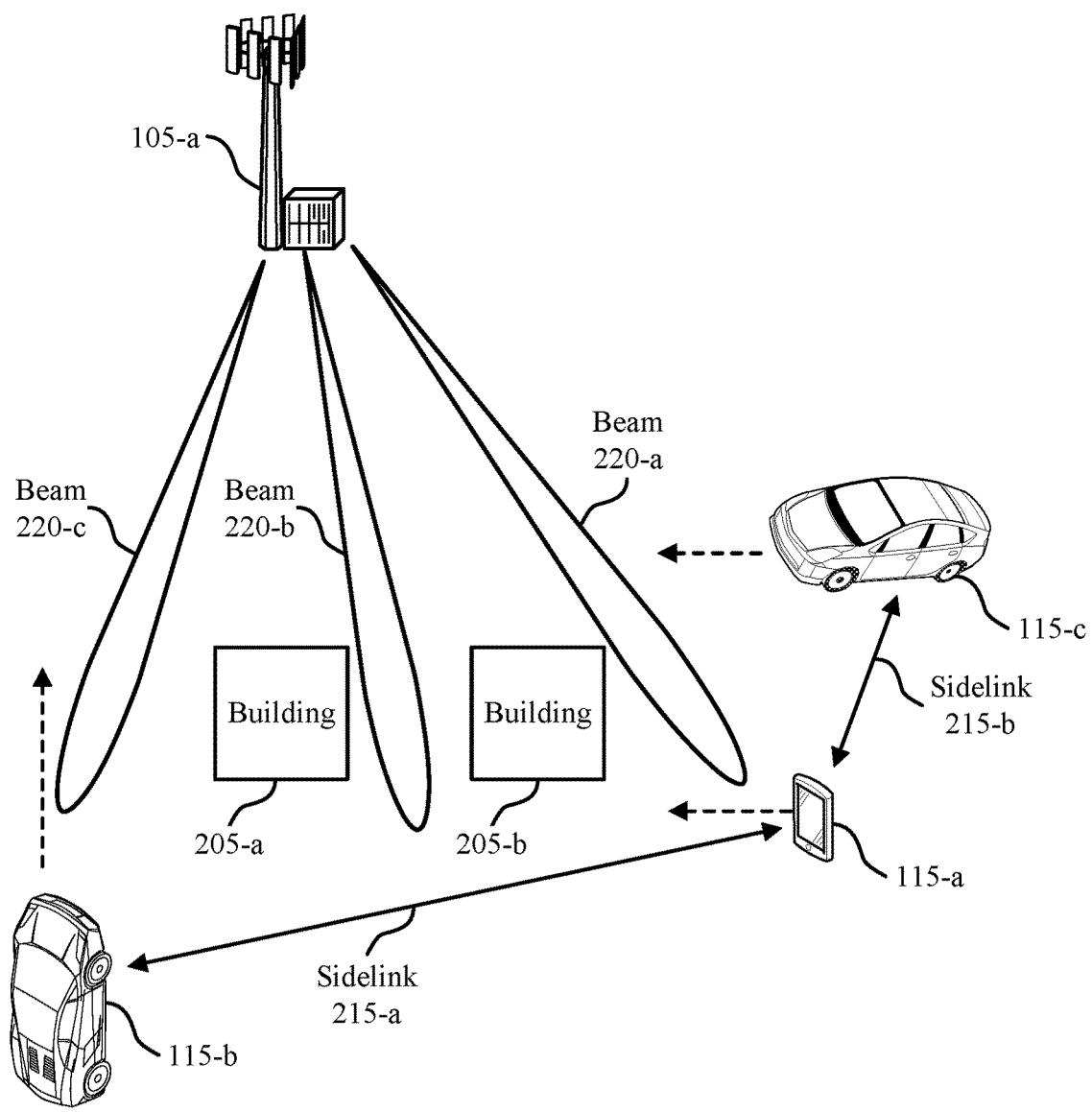

FIG. 2 illustrates an example of a wireless communications system 200 that supports generation and transmission of measurement reports based on sensing capabilities in accordance with aspects of the present disclosure. In some cases, the wireless communications system 200 may implement aspects of wireless communications system 100. For example, the wireless communications system 200 may include the UEs 115 and a base station 105-a, which may be respective examples of corresponding devices described herein. In some cases, the UE 115-a may be in communication with the base station 105-a via a beam 220-a. Additionally, the UEs 115 may be in communication with each other via sidelinks 215.

The base station 105-a may communicate with the UEs 115 via beams 220 (e.g., narrow mmW beams). For example, the base station 105-a may transmit downlink messaging to the UE 115-a via the beam 220-a. In some cases, in order for the UE 115-a to receive messages from the base station 105-a via a beam 220, the UE 115-a may be in a connected state (e.g., a radio resource control (RRC) connected state). Additionally, the base station 105-a may optionally communicate with the UE 115-b or 115-c via beams 220-c and 220-a, respectively. In some instances, one or both of the UEs 115-b and 115-c may be not be in a connected state with the base station 105-a (e.g., not in the RRC connected state, in an RRC inactive state, in an RRC idle state). Here, prior to communicating with the UE 115 that is not in the connected state, the base station 105-a may page the UE 115 to transition the UE 115 to the connected state. Then, the base station 105-a may communicate with the UE 115 via a beam 220.

In some cases, communications between the base station 105-a and a UE 115 may become obstructed (e.g., by a building 205, by another UE 115). Here, the base station 105-a may switch from communicating with the UE 115 via a first beam 220 to another beam 220. For example, the UE 115-a may move towards the building 205-b, thus blocking communications from the base station 105-a via the beam 220-a. Thus, the UE 115-a may instead receive communications from the base station 105-a via the beam 220-b.

One or more of the UEs 115 may include sensors (e.g., lidar, radar, cameras) to detect objects (e.g., other UEs 115, buildings 205) near the UE 115. That is, the UE 115-a may rely on data collected from one or more sensors at the UE 115-a to detect the building 205-b, the UE 115-b and the UE 115-c. Additionally, the UE 115-a may detect a direction of motion associated with the UEs 115-b and 115-c using sensors at the UE 115-a. Thus, the UE 115-a may achieve a level of situational awareness using data collected by sensors at the UE 115-a.

In some cases, a UE 115 may achieve a higher level of situational awareness by using data collected by sensors at the UE 115 in combination with data collected by sensors at other UEs 115. For example, the UE 115-a may be unable to detect the building 205-a based on data collected by sensors at the UE 115-a. However, the UE 115-a may identify the building 205-a based on data collected by the UE 115-b. Additionally, the UE 115-a may be able to more accurately determine a speed, location, direction of movement, or other characteristic associated with other UEs 115 based on receiving data collected by sensors at other UEs 115. In another example, the UE 115-c may not detect the UE 115-b using sensors at the UE 115-c (e.g., due to the buildings 205-a and 205-b obstructing communications between the UEs 115-c and 115-b). Here, the UE 115-c may rely on data collected by sensors at the UE 115-a to identify a location, speed, and direction of movement of the UE 115-b, thus increasing a situational awareness of the UE 115-c. In the example of wireless communications system 200, the UEs 115 may participate in sensor sharing to enable UEs 115 to develop a situational awareness. For example, the UE 115-a may combine data collected by sensors at the UE 115-a with data collected at the UE 115-b, the UE 115-c, or both.

In the example of wireless communications system 200, UEs 115 participating in sensor sharing may transmit sensing measurement reports to the base station 105-a. For example, the base station 105-a may transmit a request for a UE 115 to generate a sensing measurement report (e.g., using one or more sensors at the UE 115). Then, the UE 115 may transmit the requested sensing measurement report to the base station 105-a. The base station 105-a may integrate the received sensing measurement reports from the multiple connected UEs 115 to generate a situational awareness picture of the wireless communications system 200. Additionally, the base station 105-a may determine a near-future states of the wireless communications system 200 (e.g., the future location of the UEs 115) based on the current location, speed, and direction of the UEs 115. As such, the base station 105-a may repeatedly (e.g., periodically, aperiodically) request sensing measurement reports from the UEs 115 to maintain the global view of the wireless communications system 200.

Additionally, the base station 105-a may use received sensing measurement reports to predict a blockage or obstruction for communications between the base station 105-a and a UE 115. For example, the base station 105-a may receive sensor data from the UEs 115 and determine that, based on the direction of movement of the UE 115-a and the building 205-b, the communications between the UE 115-a and the base station 105-ba may be obstructed. Here, the base station 105-a may preemptively handover communications between the UE 115-a and the base station 105-a via beam 220-a to beam 220-b.

In some cases, the base station 105-a repeatedly requesting and receiving measurement reports from all connected UEs 115 within the wireless communications system 200 may result in increased power consumption and resource usage (e.g., when compared to the base station 105-a selectively requesting and receiving measurement reports from a subset of the connected UEs 115). For example, a high quantity of sensor measurement reports transmitted to the base station 105-a may introduce signaling overhead and latency into the wireless communications system 200. In some cases, some of the UEs 115 may transition from a connected state with the base station 105-a a non-connected state with the base station 105-a (e.g., an RRC inactive state, an RRC idle state) to decrease a power consumption of the UE 115. In such cases, the base station 105-a may less effective at predicting future beam blockages (e.g., when compared to a case where each of the UEs 115 are in a connected state and transmitting sensing measurement reports to the base station 105-a).

By operating in accordance with the techniques described herein, the base station 105-a may support effective sensor sharing while decreasing a power consumption within the wireless communications system 200. For example, the base station 105-a may selectively receive sensor sharing data from UEs 115 based on sensor capability information associated with the UEs 115. For example, the base station 105-a may transmit a request for the UE 115-a to indicate the sensor capability information (e.g., an indication of one or more sensors associated with the corresponding UE 115, an orientation of the corresponding UE 115, a field of view associated with the corresponding UE 115) associated with UEs 115-b and 115-c. Additionally, the UE 115-a may receive, from UE 115-b and UE 115-c, an indication of the sensing capability information associated with the corresponding one or more other UEs 115. For example, the UE 115-b may transmit, via the sidelink 215-a, an indication of the sensing capability information associated with the UE 115-b to the UE 115-a via a BSM. Additionally, the UE 115-c may transmit, via the sidelink 215-b, an indication of the sensing capability information associated with the UE 115-c to the UE 115-a via a BSM.

In response to receiving the request for the sensing capability information from the base station 105-a, the UE 115-a may transmit an indication of the sensing capability information associated with the UEs 115-b and 115-c to the base station 105-a.

The base station 105-a may then request sensing measurement reports from one or both of the UEs 115-b and 115-c based on the indicated sensing capability information. That is, based on a mobility of the UE 115-a or a location of the UE 115-a, the base station 105-a may request sensor data for sensor sharing from the UE 115-b, the UE 115-c, or both. For example, the base station 105-a may determine to request a sensing measurement report from the UE 115-b. Here, the base station 105-a may transmit, to the UE 115-b, a request for the UE 115-b to generate a sensing measurement report. The base station 105-a may then receive the sensing measurement report from the UE 115-b. Here, the UE 115-c may refrain from transmitting sensor measurement reports to the base station 105-a (e.g., in cases that the base station 105-a does not request a sensor measurement report from the UE 115-c), thus resulting in a decreased power consumption at the UE 115-c. In this way, the UE 115-a may still receive data associated with sensor sharing in cases where high situational awareness is useful (e.g., in higher mobility, in crowded locations) and may additionally conserve power in cases where less situational awareness is appropriate (e.g., in lower mobility, in less crowded locations).

Figure 3:
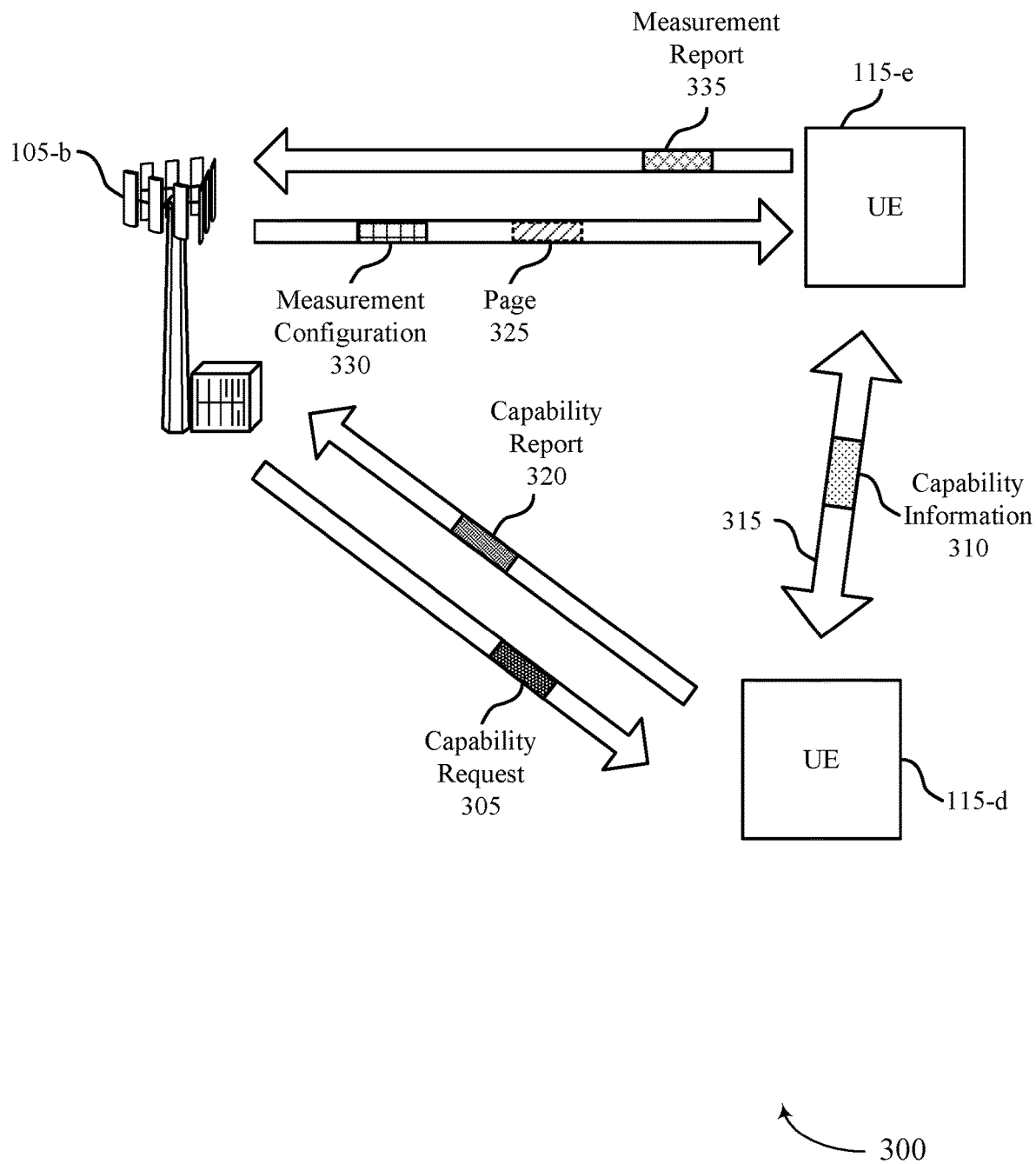

FIG. 3 illustrates an example of a wireless communications system 300 that supports generation and transmission of measurement reports based on sensing capabilities in accordance with aspects of the present disclosure. The wireless communications system 300 may implement aspects of the wireless communications systems 100 and 200 or may be implemented by aspects of the wireless communications systems 100 and 200 as described with reference to FIGS. 1 and 2. For example, wireless communications system 300 may include a UE 115-d, a UE 115-e, and a base station 105-b, which may be examples of corresponding devices described with reference to FIGS. 1 and 2. In addition, while wireless communications system 300 shows communications between the UE 115-d, the UE 115-e, and the base station 105-b, it should be understood that these processes may occur between any number of network devices.

In the example of wireless communications system 300, the UE 115-d may be in a connected state with the base station 105-b (e.g., in an RRC connected state). That is, the UE 115-d may communicate with the base station 105-b via uplink and downlink communications. Additionally, the UE 115-e may not be in a connected state with the base station 105-b (e.g., the UE 115-e may be in an RRC inactive state, the UE 115-e may be in an RRC idle state).

The base station 105-b may transmit the capability request 305 to the UE 115-d. For example, the base station 105-b may determine that the UE 115-d has a relatively high mobility (e.g., the base station 105-b determines that a speed of the UE 115-d exceeds a threshold speed) and the base station 105-b may request sensing capability information associated with UEs 115 in the wireless communications system 300 to enable the base station 105-b to predict possible beam blockages for communications with the UE 115-d. For example, the UE 115-d may be moving in a direction such that an object (e.g., a building, a tree, a vehicle) may block a beam for communications from the base station 105-b to the UE 115-d. As such, the base station 105-b may transmit the capability request 305 to the UE 115-d, which may request that the UE 115-d provide sensing capability information 310 associated with the UE 115-e.

In some cases, the UE 115-d may receive capability information 310 (e.g., sensing capability information) from the UE 115-e via the sidelink 315. In some cases, the UE 115-e may communicate the capability information 310 within a BSM. Additionally, the capability information 310 may indicate sensors at the UE 115-e (e.g., lidar, cameras, radar), a quantity of short range and long range radars equipped at the UE 115-e, an orientation of the UE 115-e, a lidar capability of the UE 115-e, a resolution of the UE 115-e, a mono and stereo camera capability at the UE 115-e, a depth resolution of the UE 115-e, or a combination thereof. In some cases, the UE 115-d may additionally receive capability information 310 from other UEs 115 (e.g., not illustrated in the wireless communications system 300).

Based on receiving the capability information 310 from the UE 115-e, the UE 115-d may determine whether the UE 115-e has a sensing capability. For example, the UE 115-d may determine, based on the capability information 310, that the UE 115-e has a sensing capability (e.g., is equipped with sensors, is operable to generate sensing measurement reports). The UE 115-d may report the capability information 310 from the one UEs 115 to the base station 105-b via a capability report 320 message. In some cases, the capability report 320 transmitted by the UE 115-d to the base station 105-b may include information for the base station 105-b to identify UEs 115 included in the capability report 320 (e.g., UE 115-e). In one example, the UE 115-d may include a shortened-temporary mobile subscriber identity (S-TMSI) corresponding to each UE 115 included in the capability report 320. In another example, the UE 115-d may include a sidelink layer-2 (L2) identification corresponding to each UE 115 included in the capability report 320.

The base station 105-b may receive the capability report 320 and may, in some cases, page the UEs 115 indicated in the capability report. That is, the capability report 320 may indicate a UE 115-e that is not in a connected state. Thus, the base station 105-b may use the identifiers included in the capability report 320 to transmit a page 325 message to the UE 115-e. In an example where the capability report 320 includes S-TMSIs associated with the one or more sensing capable UEs 115, the base station 105-b may page each of the sensing capable UEs 115 by including their respective S-TMSI in one or more page 325 messages. In an example where the capability report 320 includes L2 identifiers associated with the one or more sensing capable UEs 115, the page 325 message may be a radio access network (RAN) paging message. In either case, the page 325 may indicate for the UE 115-e to transition to a connected state (e.g., an RRC connected state).

In another example, the base station 105-b may request a mobility management entity (MME) to initiate the page 325 message to the sensing capable UEs 115. Here, the base station 105-b may act as a network function and may use a separate interface to communicate to an access and mobility management function (AMF) to transmit the one or more page 325 messages to the sensing capable UEs 115. In another example, the base station 105-b may use identifier mapping between sidelink and Uu to obtain the Uu identifier of each UE 115 included in the capability report 320 and may page 325 each of the sensing capable UEs 115 using their respective Uu identifiers.

The base station 105-b may transmit a measurement configuration 330 to the UEs 115. For example, the base station 105-b may transmit the measurement configuration 330 message to the UE 115-e. In some cases, the measurement configuration 330 message may indicate a deep learning parameter sets (which may request autoencoded features provided on a per sensor basis or provided to a subset of sensors). In one example, the base station 105-*b* may request the autoencoded features based on different sensors (e.g., the measurement configuration 330 may request radar and lidar data to be autoencoded independently). In another example, the base station 105-*b* may request autoencoded combined features. For instance, the base station 105-*b* may request autoencoded combined features from the UE 115-*e* based on combined radar and lidar measurements and may independently request features based on the camera at the UE 115-*e* (e.g., based on a field of view, based on a heading of the UE 115-*e*).

In some cases, the base station 105-*b* may indicate one or more architectural parameters for a recurrent neural network (RNN) to the UE 115-*e* via the measurement configuration 330. For example, the architectural parameters may include the RNN type, where the RNN type corresponds to a gated recurrent unit (GRU), a long short-term memory (LSTM) unit), an application type (e.g., many-to-one, vs. many-to-many), a variant (directional vs. bi directional), a loss function, a number of layers of the RNN, activation functions used in the different RNN layers, the initialization weight parameters, drop out parameters, parameters for various gates (e.g., update, relevance, forget, and output gates), or a combination thereof. In one example, the base station 105-*b* may indicate, via the measurement configuration 330, architectural parameters for a convolutional neural network such as the convolutional filter size, the number of filters, the stride size (e.g., used for different layers), batch normalization (e.g., used for fast learning), and a pooling configuration to use for reducing the size of encoded images (e.g., maximum pool, average pool).

The deep learning parameters and associated pretrained weights may be preconfigured and selected based on various environmental characteristics. For example, the UE 115-*e* may select one or more deep learning parameter sets based on the time of day to enhance face and object detection capability. That is, the base station 105-*b* may configure the UE 115-*e* with a first convolution filter (e.g., convolution filter-1) which may be used during the day, and a second convolution filter (e.g., convolution filter-2) which may be used during the dusk. The information relating to the various convolution filters may be preconfigured in the application layer of the UE 115-*e*. In one example, the base station 105-*b* may provide the UE 115-*e* with a sensing initiation paging, and based on the time of the day and the other preconfigured parameters, the UE 115-*e* may provide sensing results back to the base station 105-*b* in a measurement report 335.

In some cases, the page 325 message transmitted by the base station 105-*b* may be characterized as a sensing initiation paging type (e.g., type-1 or type-2) that may indicate to the UE 115-*e* which preconfigured deep learning parameter set to use. For example, if the base station 105-*b* transmits the page 325 as a sensing initiation paging type-1, the UE 115-*e* may use a first preconfigured deep learning set (e.g., set-1). Additionally, if the base station 105-*b* transmits the page 325 as a sensing initiation paging type-2, the UE 115-*e* may use a second preconfigured deep learning set (e.g., set-2). In some cases, the sensing initiation paging type and corresponding deep learning parameter set may be based on the speed of the UE 115-*d*. For example, if the UE 115-*d* has high mobility such that the speed of the UE 115-*d* is above a first configured threshold, the base station 105-*b* may request sensing information from a first set of sensing capable UEs 115 and may request the first set of UEs 115 to use the deep learning parameter set 1. If, however, the UE 115-*d* has a mobility such that the speed of the UE 115-*d* is above the first configured threshold but below a second configured threshold, the base station 105-*b* may request sensing information from a second set of sensing capable UEs 115 and may request the second set of UEs 115 to use the deep learning parameter set-2.

In some cases, the base station 105-*b* may initiate a deep learning set at the UE 115-*e* based on the geographical zone of the UE 115-*d*. For example, if the UE 115-*d* is in a first geographical zone (e.g., a busy intersection), the base station 105-*b* may request a first deep learning parameter set for the UE 115-*e* to use for sensing measurements. In some examples, the base station 105-*b* may request the UE 115-*d* to include more or less UEs 115 in the capability report 320 based on the geographical zone. For example, if the UE 115-*d* is in the first geographical zone (e.g., a busy intersection), the base station 105-*b* may request the UE 115-*d* to include more UEs 115 in the capability report 320 to achieve a finer clarity of the environment surrounding the UE 115-*d* as to more accurately predict a beam blockage.

In some cases, the number of sensing capable UEs 115 the base station 105-*b* requests sensing information from and the type of sensing information requested (e.g., raw information vs. meta information, high resolution vs. low resolution images, point clouds, etc.) may be based on the speed of the UE 115-*d*. In cases where the UE 115-*e* is moving with a variant speed (e.g., a speed that changes on a relative time scale configured by the base station 105-*b*), the base station 105-*b* may request a greater number of sensing capable UEs 115 to transmit a measurement report 335. The base station 105-*b* may also request, from the UE 115-*d*, finer information regarding the sensing capability of each sensing capable UE 115 indicated in the capability report 320. The base station 105-*b* may request additional (e.g., finer) information from sensing capable UEs 115 based on a likelihood of a beam blockage increasing when the UE 115-*d* is experiencing higher mobility.

Based on the received measurement configuration 330 message, the one or more UEs 115 may transmit a measurement report 335 to the base station 105-*b*. The measurement report 335 may include sensing information that was collected based on the deep learning parameters configured in the measurement configuration 330 message. From the one or more measurement report 335 messages, the base station 105-*b* may analyze the environmental surroundings of the UE 115-*d* and may predict near-future beam blocking events and adjust the directionality of the beam to maintain connection with the UE 115-*d*.

Figure 4:
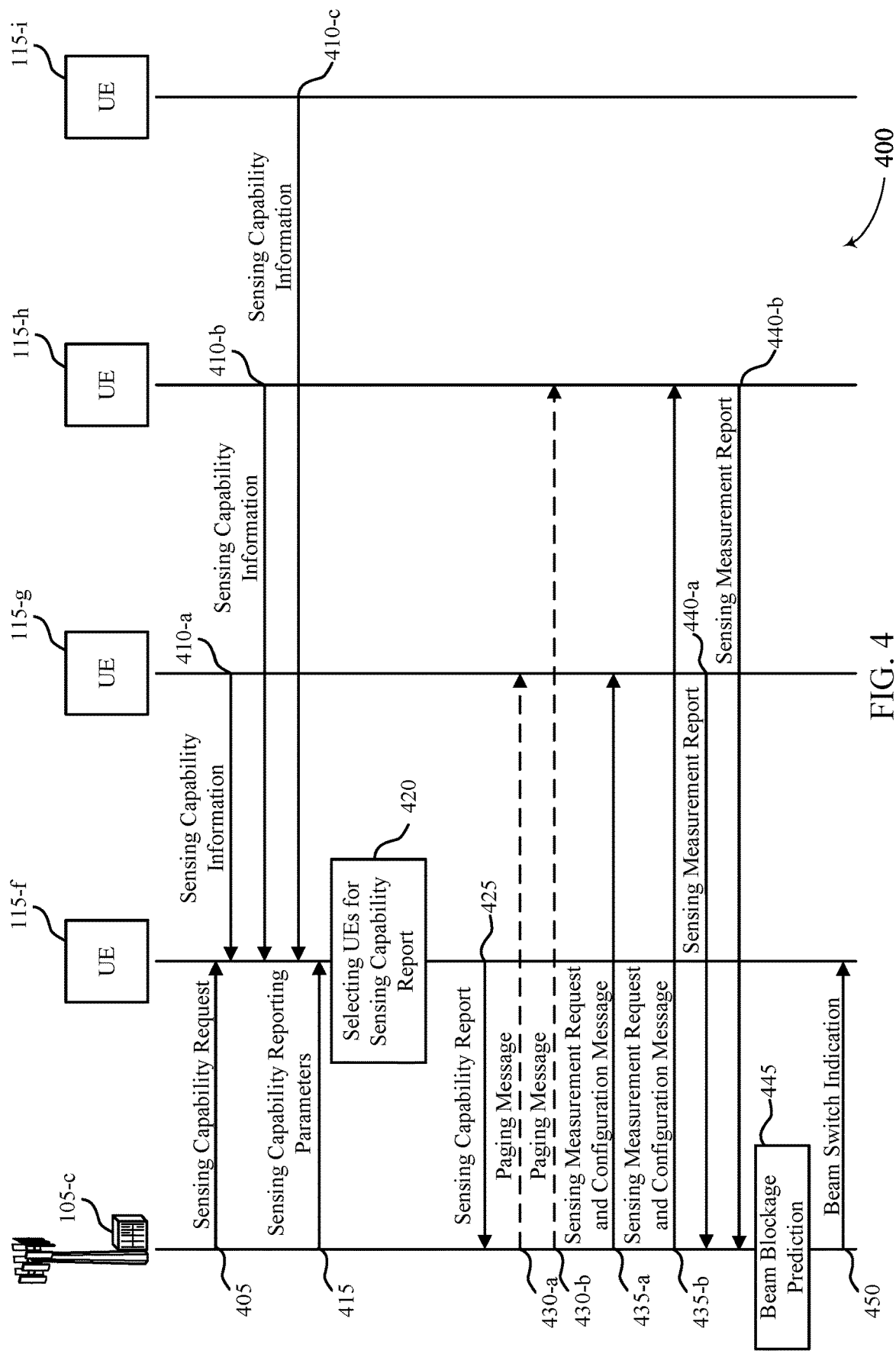
FIG. 4 illustrates an example of a process flow that supports generation and transmission of measurement reports based on sensing capabilities in accordance with aspects of the present disclosure.

FIG. 4 illustrates an example of a process flow 400 that supports generation and transmission of measurement reports based on sensing capabilities in accordance with aspects of the present disclosure. In some examples, process flow 400 may implement aspects of FIGS. 1 through 3. For example, the process flow 400 may include UEs 115-*f*, 115-*g*, 115-*h*, and 115-*i* as well as base station 105-*c*, which may be respective examples of UEs 115 and a base station 105 as described with reference to FIGS. 1 through 3, respectively. Alternative examples of the following may be implemented, where some steps are performed in a different order than described or are not performed at all. In some cases, steps may include additional features not mentioned below, or further steps may be added. In addition, while process flow 400 shows processes between a single base station 105-*c* and four UEs 115, it should be understood that these processes may occur between any number of network devices.

At 405, the UE 115-*f* may receive, from the base station 105-*c*, a sensing capability request for the UE 115-*f* to provide capability information associated with the other second UEs 115 within range of the UE 115-*f* (e.g., the UE 115-*g* through the UE 115-*i*). In some examples, the UE 115-*f* may receive the sensing capability request from the base station 105-*c* based on the mobility of the UE 115-*f*.

At 410, the UE 115-*f* may receive, from the other UEs 115 (e.g., the UE 115-*g* through the UE 115-*i*), respective indications of the sensing capability information associated with the corresponding second UEs 115. For example, the UE 115-*f* may participate in sidelink communications with each of the second UEs 115 and may receive, from each of the second UEs 115, respective BSMs that may include the sensing capability information associated with the corresponding second UEs 115. The sensing capability information may include an indication of one or more sensors associated with the corresponding second UEs 115 (e.g., lidar, radar, cameras, etc.), an orientation of the corresponding second UEs 115, a field of view associated with the corresponding second UEs 115, or a combination thereof.

At 415, the UE 115-*f* may receive from the base station 105-*c*, a set of sensing capability reporting parameters. For example, the reporting parameters may pertain to at least one of a number of the one or more second UEs 115 whose sensing capability information is to be included in a sensing capability report or a nature of the sensing capability information to be included in the sensing capability report. One or more of the received reporting parameters that pertain to the nature of the sensing capability information to be included in the sensing capability report and which specify that the nature of the sensing capability information may be at least one of raw information, meta information, information of a specified resolution quality, images, or point clouds. In some examples, the values of the plurality of reporting parameters are based on a geographical zone of the UE 115-*f*, a mobility of the UE 115-*f*, or a combination thereof.

At 420, the UE 115-*f* may select one or more of the second UEs 115 to include in the sensing capability report based on the respective indications of the sensing capability information received from each of the second UEs 115. The UE 115-*f* selecting the one or more second UEs 115 may be based on the one or more second UEs 115 being associated with a sensing capability. In the example of process flow 400, the UE 115-*g* and the UE 115-*h* both indicated in their respective sensing capability information that they are sensing capable while UE 115-*i* indicated in its sensing capability information that it is not sensing capable. As such, the UE 115-*f* may select the UE 115-*g* and the UE 115-*h* to include in the sensing capability report.

At 425, the UE 115-*f* may transmit, to the base station 105-*c* in response to the sensing capability request, the sensing capability report. In the example of process flow 400, the sensing capability report includes sensing capability information for the UE 115-*g* (e.g., UE1) and for the UE 115-*h* (e.g., UE2). The sensing capability report may also include a S-TMSI associated with the one or more second UEs 115 (e.g., the UE 115-*g* and the UE 115-*h*), a sidelink L2 ID associated with the one or more second UEs 115 (e.g., the UE 115-*g* and the UE 115-*h*), or a combination thereof.

At 430, the base station 105-*c* may transmit a paging message with each of the one or more second UEs 115 indicated in the sensing capability report. For example, the base station 105-*c* may perform, based on receiving the indication of the sensing capability information, a paging procedure with each of the one or more second UEs 115 (e.g., the UE 115-*g* and the UE 115-*h*), to transition each of them from an inactive mode (e.g., RRC inactive) to a connected mode (e.g., RRC connected). The paging message transmitted to each of the UEs 115 indicated in the sensing capability report may include S-TMSI associated with respective one or more second UEs 115 or an identifier associated with the respective one or more second UEs 115 determined based on a mapping between sidelinks and communication links between the base station 105-*c* and the respective one or more second UEs 115. In some cases, the base station 105-*c* performing the paging procedure may include transmitting, to an MME, a request to initiate the paging procedure with each of the one or more second UEs 115, where performing the paging procedure may be based on the base station 105-*c* transmitting the request to the MME.

At 435, the base station 105-*c* may transmit to the one or more second UEs 115 a sensing measurement request and configuration message. The sensing measurement request and configuration message may include one or more indications that are indicative of a set of configurations for generating a sensing measurement report. The sensing measurement request and configuration message may also request the one or more second UEs 115 to generate respective sensing measurement reports. For example, the base station 105-*c* may transmit a paging message to the one or more second UEs 115 which may indicate which of the configurations from the set of configurations the one or more second UEs 115 should use for generating their respective sensing measurement reports. In one example, the base station 105-*c* may indicate to the one or more second UEs 115 which of the configurations to use for generating their sensing measurement report based on the mobility of the UE 115-*f*.

At 440, the base station 105-*c* may receive from the one or more second UEs 115 respective sensing measurement reports in accordance with the sensing measurement request and configuration message. At 445, the base station 105-*c* may use the one or more sensing measurement reports received from the one or more second UEs 115 to make a beam blockage prediction for communication with the UE 115-*f*.

At 450, the UE 115-*f* may receive, from the base station 105-*c*, an indication to switch from a first beam for communications between the base station 105-*c* and the UE 115-*f* to a second beam for the communications between the base station 105-*c* and the UE 115-*f*.

Figure 5:
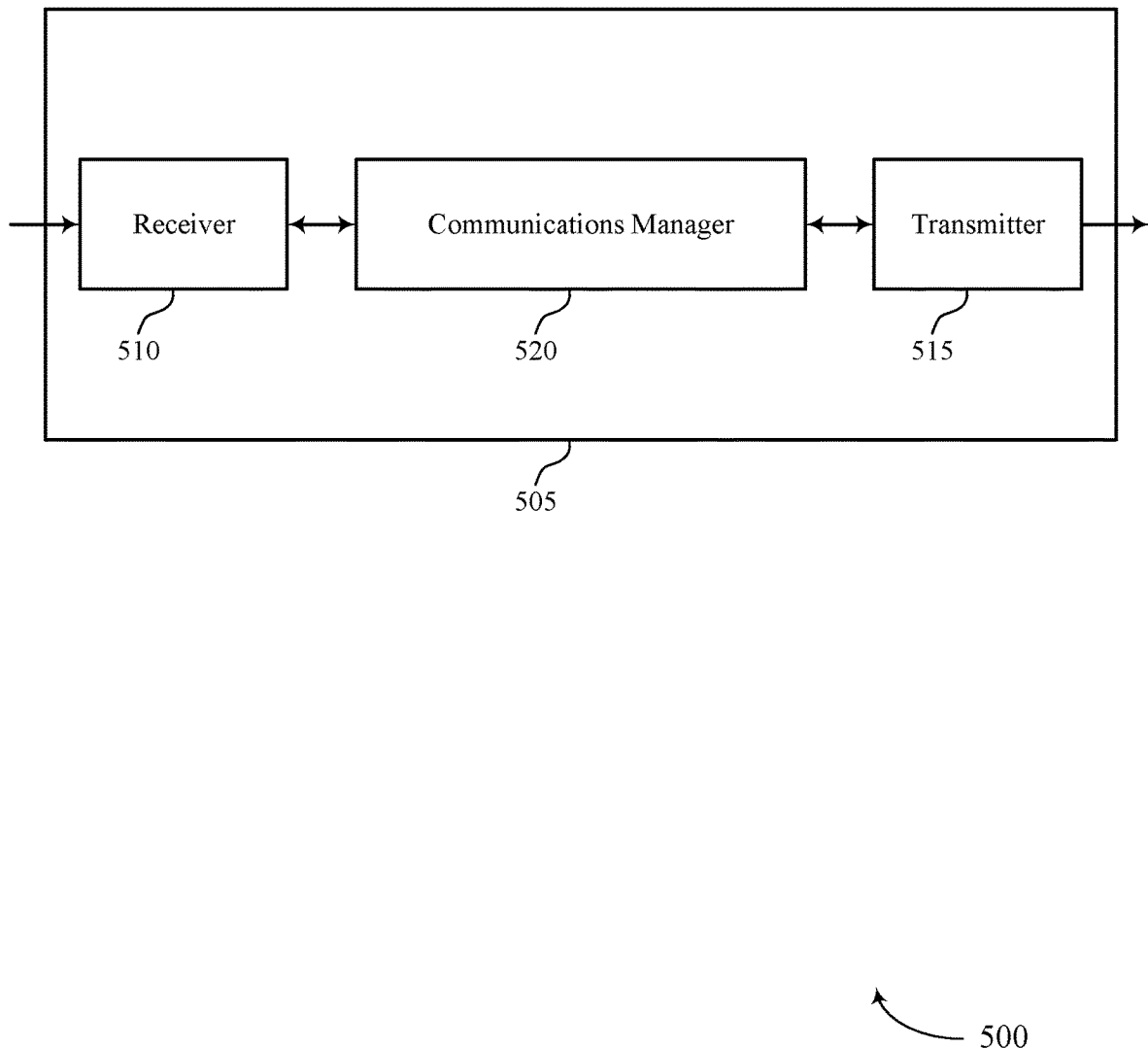
FIGS. 5 and 6 show block diagrams of devices that support generation and transmission of measurement reports based on sensing capabilities in accordance with aspects of the present disclosure.

FIG. 5 shows a block diagram 500 of a device 505 that supports generation and transmission of measurement reports based on sensing capabilities in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to generation and transmission of measurement reports based on sensing capabilities). Information may be passed on to other components of the device 505. The receiver 510 may utilize a single antenna or a set of multiple antennas.

The transmitter 515 may provide a means for transmitting signals generated by other components of the device 505.

For example, the transmitter 515 may transmit information such as packets, user data, control information, or any combination thereof associated with various information channels (e.g., control channels, data channels, information channels related to generation and transmission of measurement reports based on sensing capabilities). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of generation and transmission of measurement reports based on sensing capabilities as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving, from a base station, a request for the first UE to provide sensing capability information associated with UEs other than the first UE. The communications manager 520 may be configured as or otherwise support a means for receiving, from each of a set of multiple second UEs, respective first indications of the sensing capability information associated with corresponding second UEs. The communications manager 520 may be configured as or otherwise support a means for selecting one or more second UEs from the set of multiple second UEs based on the respective first indications of the sensing capability information. The communications manager 520 may be configured as or otherwise support a means for transmitting, to the base station in response to the request, a second indication of the sensing capability information associated with the one or more second UEs.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption.

Figure 6:
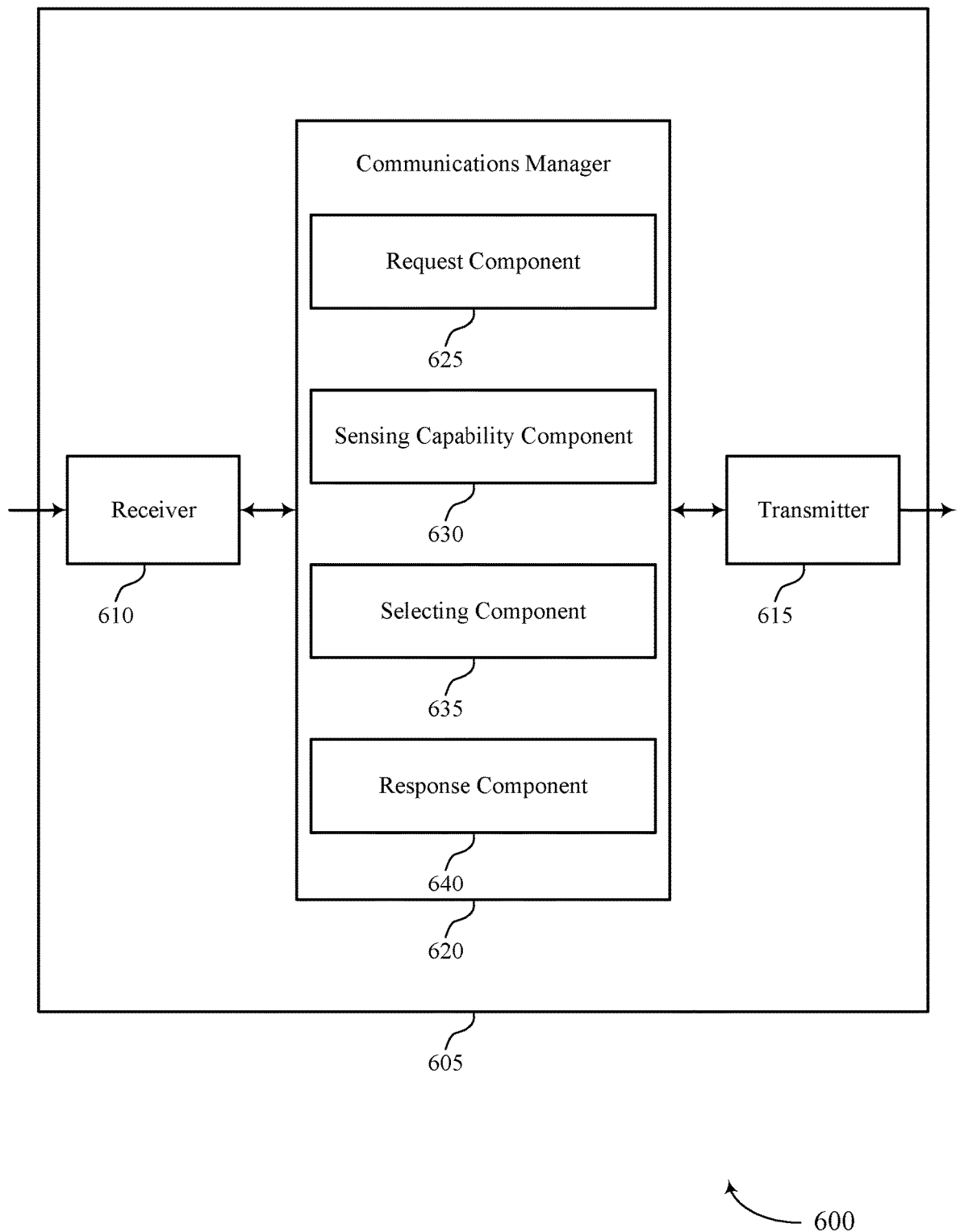

FIG. 6 shows a block diagram 600 of a device 605 that supports generation and transmission of measurement reports based on sensing capabilities in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to generation and transmission of measurement reports based on sensing capabilities). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to generation and transmission of measurement reports based on sensing capabilities). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of generation and transmission of measurement reports based on sensing capabilities as described herein. For example, the communications manager 620 may include a request component 625, a sensing capability component 630, a selecting component 635, a response component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The request component 625 may be configured as or otherwise support a means for receiving, from a base station, a request for the first UE to provide sensing capability information associated with UEs other than the first UE. The sensing capability component 630 may be configured as or otherwise support a means for receiving, from each of a set of multiple second UEs, respective first indications of the sensing capability information associated with corresponding second UEs. The selecting component 635 may be configured as or otherwise support a means for selecting one or more second UEs from the set of multiple second UEs based on the respective first indications of the sensing capability information. The response component 640 may be configured as or otherwise support a means for transmitting, to the base station in response to the request, a second indication of the sensing capability information associated with the one or more second UEs.

Figure 7:
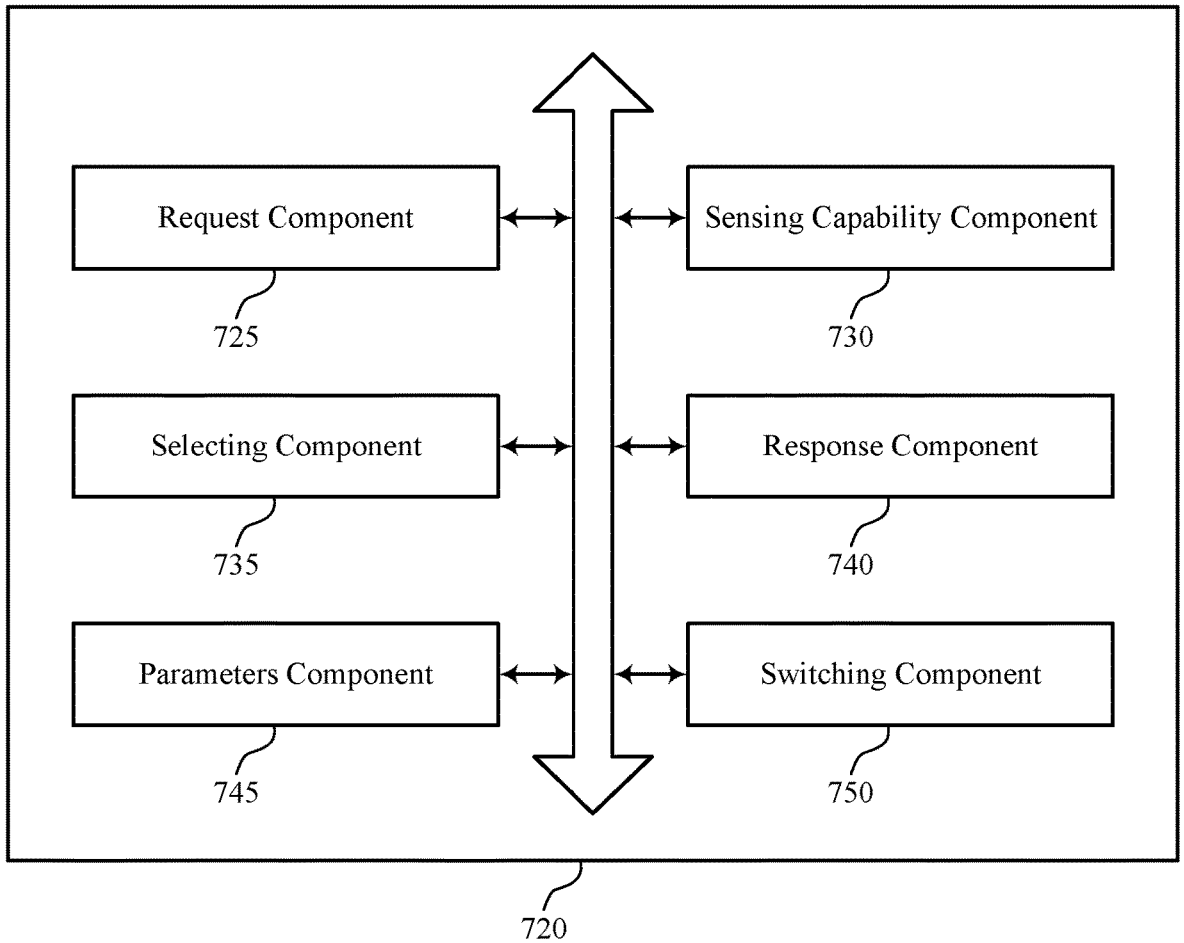
FIG. 7 shows a block diagram of a communications manager that supports generation and transmission of measurement reports based on sensing capabilities in accordance with aspects of the present disclosure.

FIG. 7 shows a block diagram 700 of a communications manager 720 that supports generation and transmission of measurement reports based on sensing capabilities in accordance with aspects of the present disclosure. The communications manager 720 may be an example of aspects of a communications manager 520, a communications manager 620, or both, as described herein. The communications manager 720, or various components thereof, may be an example of means for performing various aspects of generation and transmission of measurement reports based on sensing capabilities as described herein. For example, the communications manager 720 may include a request component 725, a sensing capability component 730, a selecting component 735, a response component 740, a parameters component 745, a switching component 750, or any combination thereof. Each of these components may communicate, directly or indirectly, with one another (e.g., via one or more buses).

The communications manager 720 may support wireless communication at a first UE in accordance with examples as disclosed herein. The request component 725 may be configured as or otherwise support a means for receiving, from a base station, a request for the first UE to provide sensing capability information associated with UEs other than the first UE. The sensing capability component 730 may be configured as or otherwise support a means for receiving, from each of a set of multiple second UEs, respective first indications of the sensing capability information associated with corresponding second UEs. The selecting component 735 may be configured as or otherwise support a means for selecting one or more second UEs from the set of multiple second UEs based on the respective first indications of the sensing capability information. The response component 740 may be configured as or otherwise support a means for transmitting, to the base station in response to the request, a second indication of the sensing capability information associated with the one or more second UEs.

In some examples, to support receiving the respective first indications of the sensing capability information, the sensing capability component 730 may be configured as or otherwise support a means for receiving, from each of the set of multiple second UEs, respective BSMs including the sensing capability information associated with the corresponding second UEs.

In some examples, the parameters component 745 may be configured as or otherwise support a means for receiving, from the base station, a set of multiple reporting parameters pertaining to at least one of a number of the one or more second UEs whose sensing capability information is to be included in the second indication or a nature of the sensing capability information to be included in the second indication, where transmitting the second indication is based on the set of multiple reporting parameters.

In some examples, values of the set of multiple reporting parameters are based on a geographical zone of the first UE, a mobility of the first UE, or a combination thereof.

In some examples, to support receiving the set of multiple reporting parameters, the parameters component 745 may be configured as or otherwise support a means for receiving one or more of the set of multiple reporting parameters that pertain to the nature of the sensing capability information to be included in the second indication and which specify that the nature of the sensing capability information is at least one of raw information, meta information, information of a specified resolution quality, images, or point clouds.

In some examples, to support selecting the one or more second UEs, the selecting component 735 may be configured as or otherwise support a means for selecting the one or more second UEs from the set of multiple second UEs based on the one or more second UEs being associated with a sensing capability.

In some examples, the switching component 750 may be configured as or otherwise support a means for receiving, from the base station based on transmitting the second indication, a third indication to switch from a first beam for communications between the base station and the first UE to a second beam for the communications between the base station and the first UE.

In some examples, to support transmitting the second indication, the response component 740 may be configured as or otherwise support a means for transmitting an S-TMSI associated with the one or more second UEs, a sidelink L2 identifier associated with the one or more second UEs, or a combination thereof.

In some examples, the sensing capability information includes an indication of one or more sensors associated with the corresponding second UEs, an orientation of the corresponding second UEs, a field of view associated with the corresponding second UEs, or a combination thereof.

Figure 8:
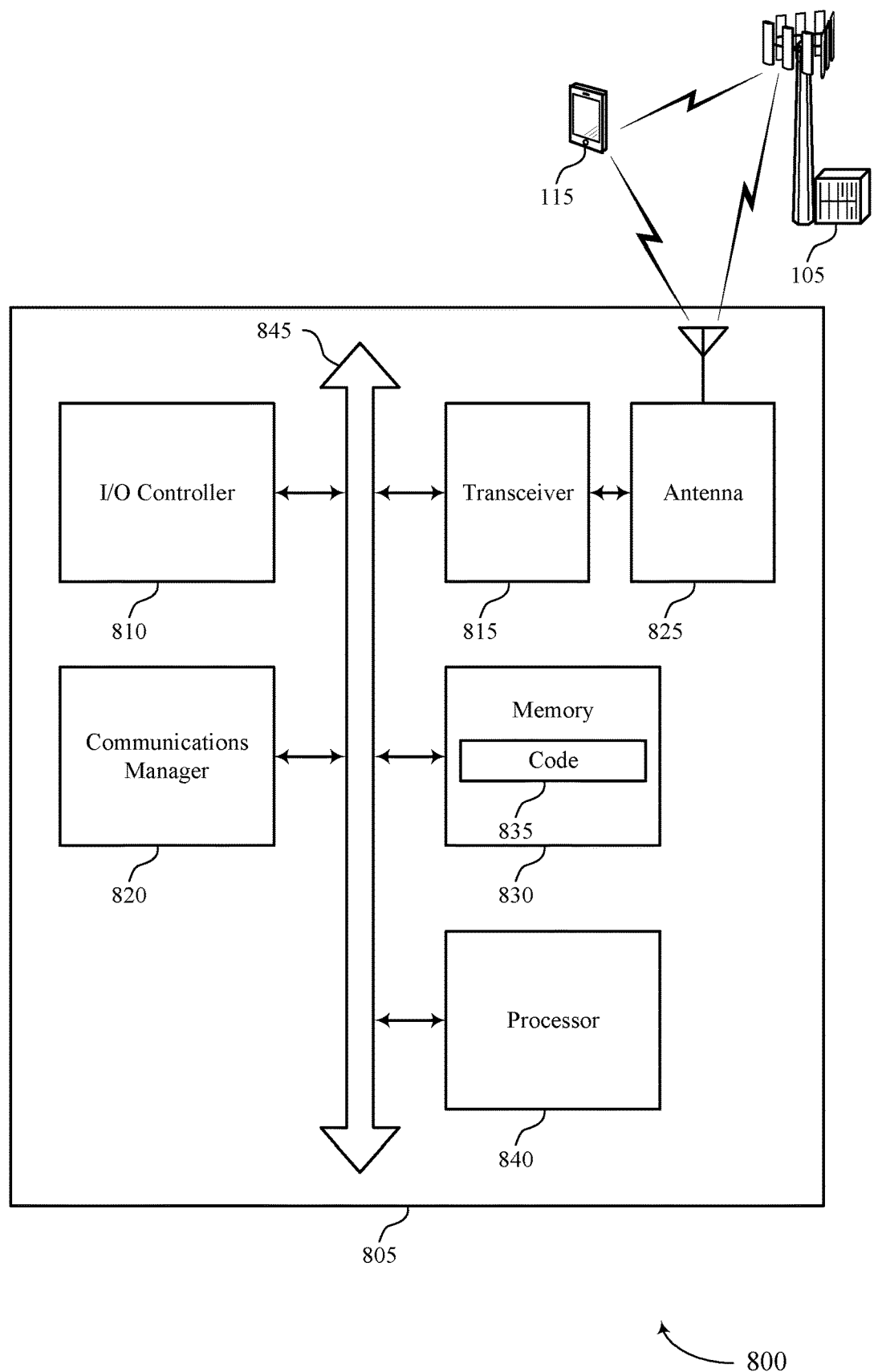
FIG. 8 shows a diagram of a system including a device that supports generation and transmission of measurement reports based on sensing capabilities in accordance with aspects of the present disclosure.

FIG. 8 shows a diagram of a system 800 including a device 805 that supports generation and transmission of measurement reports based on sensing capabilities in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting generation and transmission of measurement reports based on sensing capabilities). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving, from a base station, a request for the first UE to provide sensing capability information associated with UEs other than the first UE. The communications manager 820 may be configured as or otherwise support a means for receiving, from each of a set of multiple second UEs, respective first indications of the sensing capability information associated with corresponding second UEs. The communications manager 820 may be configured as or otherwise support a means for selecting one or more second UEs from the set of multiple second UEs based on the respective first indications of the sensing capability information. The communications manager 820 may be configured as or otherwise support a means for transmitting, to the base station in response to the request, a second indication of the sensing capability information associated with the one or more second UEs.

By including or configuring the communications manager 820 in accordance with examples as described herein, the device 805 may support techniques for reduced power consumption, improved coordination between devices, and longer battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of generation and transmission of measurement reports based on sensing capabilities as described herein, or the processor 840 and the memory 830 may be otherwise configured to perform or support such operations.

Figure 9:
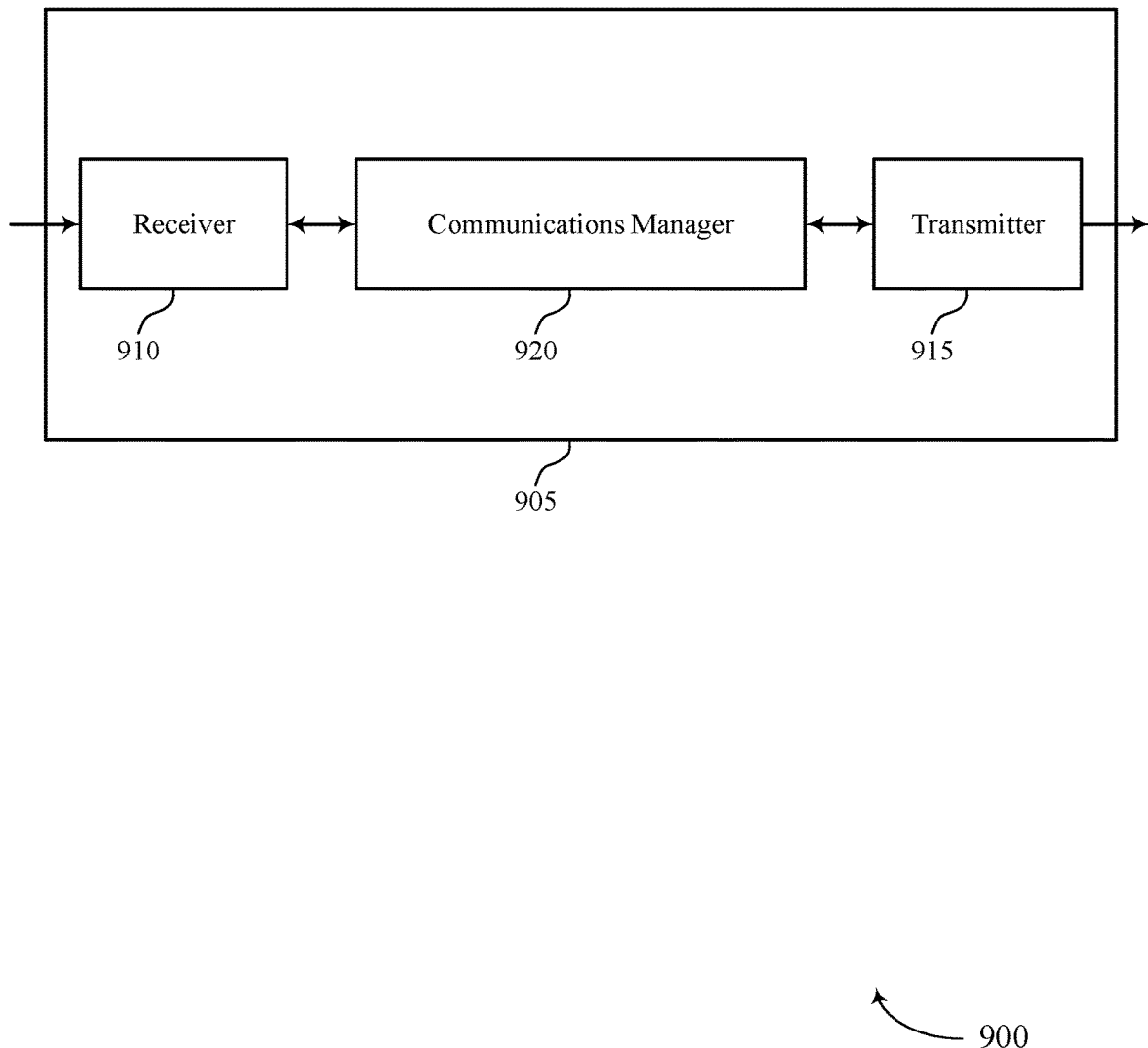
FIGS. 9 and 10 show block diagrams of devices that support generation and transmission of measurement reports based on sensing capabilities in accordance with aspects of the present disclosure.

FIG. 9 shows a block diagram 900 of a device 905 that supports generation and transmission of measurement reports based on sensing capabilities in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to generation and transmission of measurement reports based on sensing capabilities). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to generation and transmission of measurement reports based on sensing capabilities). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of generation and transmission of measurement reports based on sensing capabilities as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a first UE, a first request for the first UE to provide sensing capability information associated with UEs other than the first UE. The communications manager 920 may be configured as or otherwise support a means for receiving, from the first UE and responsive to the first request, an indication of the sensing capability information associated with one or more second UEs. The communications manager 920 may be configured as or otherwise support a means for transmitting, to each of the one or more second UEs, a second request for the one or more second UEs to generate respective sensing measurement reports. The communications manager 920 may be configured as or otherwise support a means for receiving, from the one or more second UEs and in accordance with the second request, the respective sensing measurement reports.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced power consumption.

Figure 10:
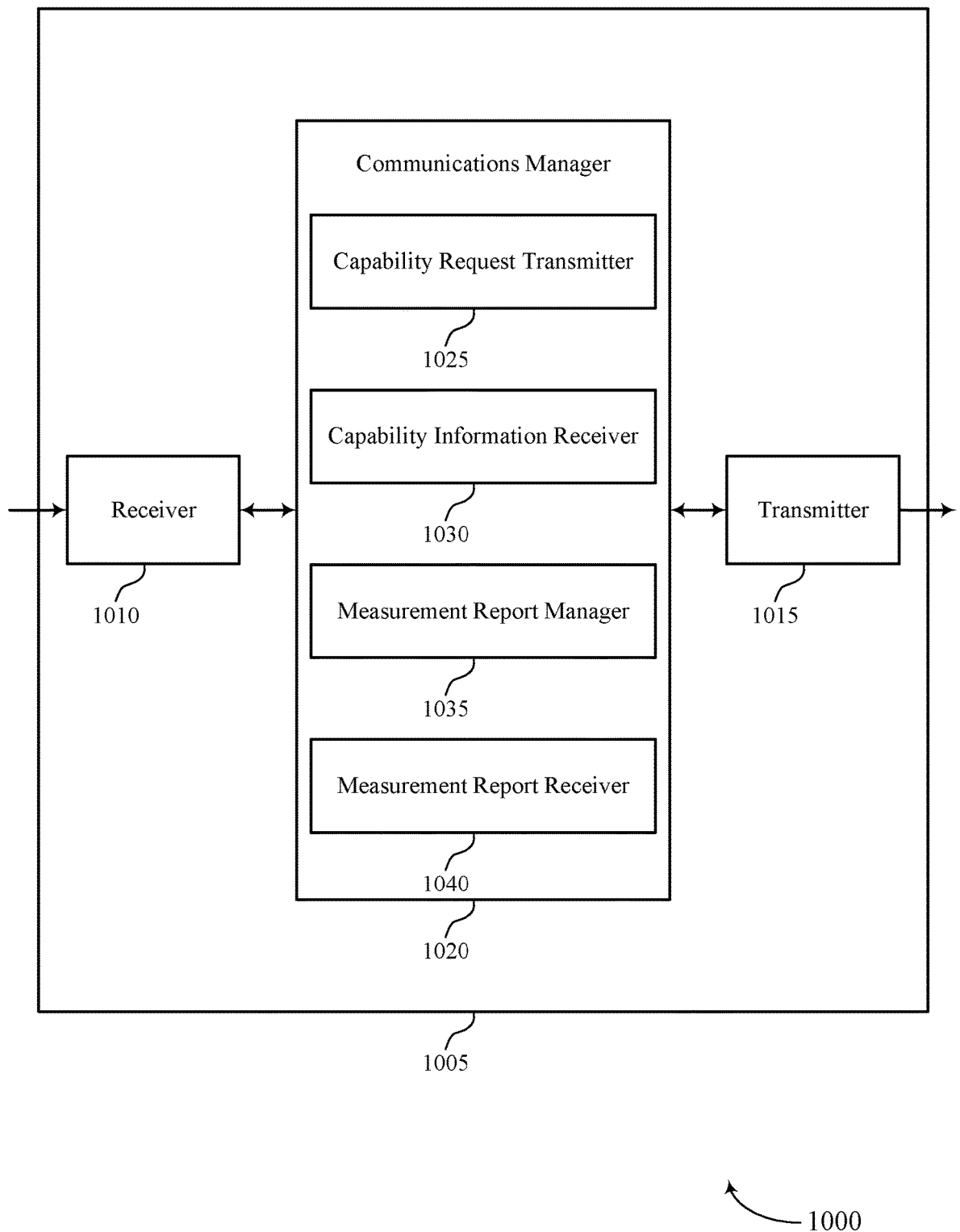

FIG. 10 shows a block diagram 1000 of a device 1005 that supports generation and transmission of measurement reports based on sensing capabilities in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to generation and transmission of measurement reports based on sensing capabilities). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to generation and transmission of measurement reports based on sensing capabilities). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of generation and transmission of measurement reports based on sensing capabilities as described herein. For example, the communications manager 1020 may include a capability request transmitter 1025, a capability information receiver 1030, a measurement report manager 1035, a measurement report receiver 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The capability request transmitter 1025 may be configured as or otherwise support a means for transmitting, to a first UE, a first request for the first UE to provide sensing capability information associated with UEs other than the first UE. The capability information receiver 1030 may be configured as or otherwise support a means for receiving, from the first UE and responsive to the first request, an indication of the sensing capability information associated with one or more second UEs. The measurement report manager 1035 may be configured as or otherwise support a means for transmitting, to each of the one or more second UEs, a second request for the one or more second UEs to generate respective sensing measurement reports. The measurement report receiver 1040 may be configured as or otherwise support a means for receiving, from the one or more second UEs and in accordance with the second request, the respective sensing measurement reports.

Figure 11:
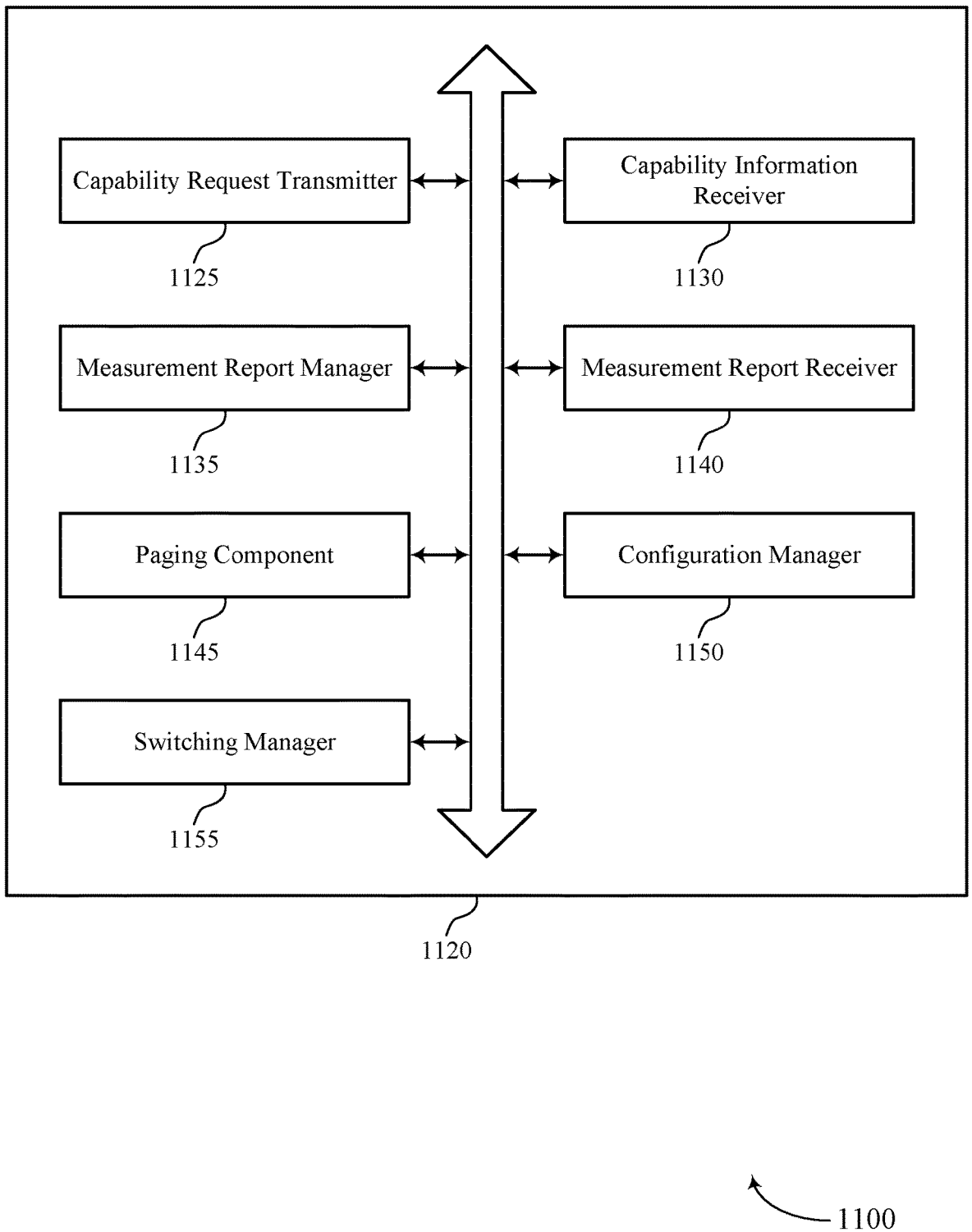
FIG. 11 shows a block diagram of a communications manager that supports generation and transmission of measurement reports based on sensing capabilities in accordance with aspects of the present disclosure.

FIG. 11 shows a block diagram 1100 of a communications manager 1120 that supports generation and transmission of measurement reports based on sensing capabilities in accordance with aspects of the present disclosure. The communications manager 1120 may be an example of aspects of a communications manager 920, a communications manager 1020, or both, as described herein. The communications manager 1120, or various components thereof, may be an example of means for performing various aspects of generation and transmission of measurement reports based on sensing capabilities as described herein. For example, the communications manager 1120 may include a capability request transmitter 1125, a capability information receiver 1130, a measurement report manager 1135, a measurement report receiver 1140, a paging component 1145, a configuration manager 1150, a switching manager 1155, or any combination thereof. Each of these components may communicate, directly or indirectly, with one another (e.g., via one or more buses).

The communications manager 1120 may support wireless communication at a base station in accordance with examples as disclosed herein. The capability request transmitter 1125 may be configured as or otherwise support a means for transmitting, to a first UE, a first request for the first UE to provide sensing capability information associated with UEs other than the first UE. The capability information receiver 1130 may be configured as or otherwise support a means for receiving, from the first UE and responsive to the first request, an indication of the sensing capability information associated with one or more second UEs. The measurement report manager 1135 may be configured as or otherwise support a means for transmitting, to each of the one or more second UEs, a second request for the one or more second UEs to generate respective sensing measurement reports. The measurement report receiver 1140 may be configured as or otherwise support a means for receiving, from the one or more second UEs and in accordance with the second request, the respective sensing measurement reports.

In some examples, the paging component 1145 may be configured as or otherwise support a means for performing, based on receiving the indication of the sensing capability information, a paging procedure with each of the one or more second UEs to transition each of the one or more second UEs from an inactive mode to a connected mode, where transmitting the second request to each of the one or more second UEs is based on performing the paging procedure.

In some examples, the paging component 1145 may be configured as or otherwise support a means for transmitting, to each of the one or more second UEs, a paging message including an S-TMSI associated with respective one or more second UEs or an identifier associated with the respective one or more second UEs determined based on a mapping between sidelinks and communication links between the base station and the respective one or more second UEs.

In some examples, the paging component 1145 may be configured as or otherwise support a means for transmitting, to a mobility management entity, a third request to initiate the paging procedure with each of the one or more second UEs, where performing the paging procedure is based on transmitting the third request.

In some examples, the configuration manager 1150 may be configured as or otherwise support a means for transmitting, to the UEs other than the first UE, one or more second indications that are indicative of a set of multiple configurations for generating sensing measurement reports. In some examples, the paging component 1145 may be configured as or otherwise support a means for transmitting, to each of the one or more second UEs, a paging message indicating one of the set of multiple configurations for generating the respective sensing measurement reports, where receiving the respective sensing measurement reports is based on transmitting the paging message.

In some examples, the configuration manager 1150 may be configured as or otherwise support a means for identifying the one of the set of multiple configurations for generating the respective sensing measurement reports based on a mobility of the first UE.

In some examples, transmitting the first request for the first UE to provide sensing capability information is based on a mobility of the first UE.

In some examples, the measurement report manager 1135 may be configured as or otherwise support a means for transmitting, to the first UE, a set of multiple reporting parameters pertaining to at least one of a number of the one or more second UEs whose sensing capability information is to be included in the indication or a nature of the sensing capability information to be included in the indication, where receiving the indication is based on transmitting the set of multiple reporting parameters.

In some examples, values of the set of multiple reporting parameters are based on a geographical zone of the first UE, a mobility of the first UE, or a combination thereof.

In some examples, to support transmitting the set of multiple reporting parameters, the measurement report manager 1135 may be configured as or otherwise support a means for transmitting one or more of the set of multiple reporting parameters that pertain to the nature of the sensing capability information to be included in the indication and which specify that the nature of the sensing capability information is at least one of raw information, meta information, information of a specified resolution quality, images, or point clouds.

In some examples, the sensing capability information includes a second indication of one or more sensors associated with the one or more second UEs, an orientation of the one or more second UEs, a field of view associated with the one or more second UEs, or a combination thereof.

In some examples, the switching manager 1155 may be configured as or otherwise support a means for transmitting, to the first UE based on receiving the respective sensing measurement reports, a second indication to switch from a first beam for communications between the base station and the first UE to a second beam for the communications between the base station and the first UE.

In some examples, to support receiving the indication, the capability information receiver 1130 may be configured as or otherwise support a means for receiving associated with the one or more second UEs, a sidelink L2 identifier associated with the one or more second UEs, or a combination thereof.

Figure 12:
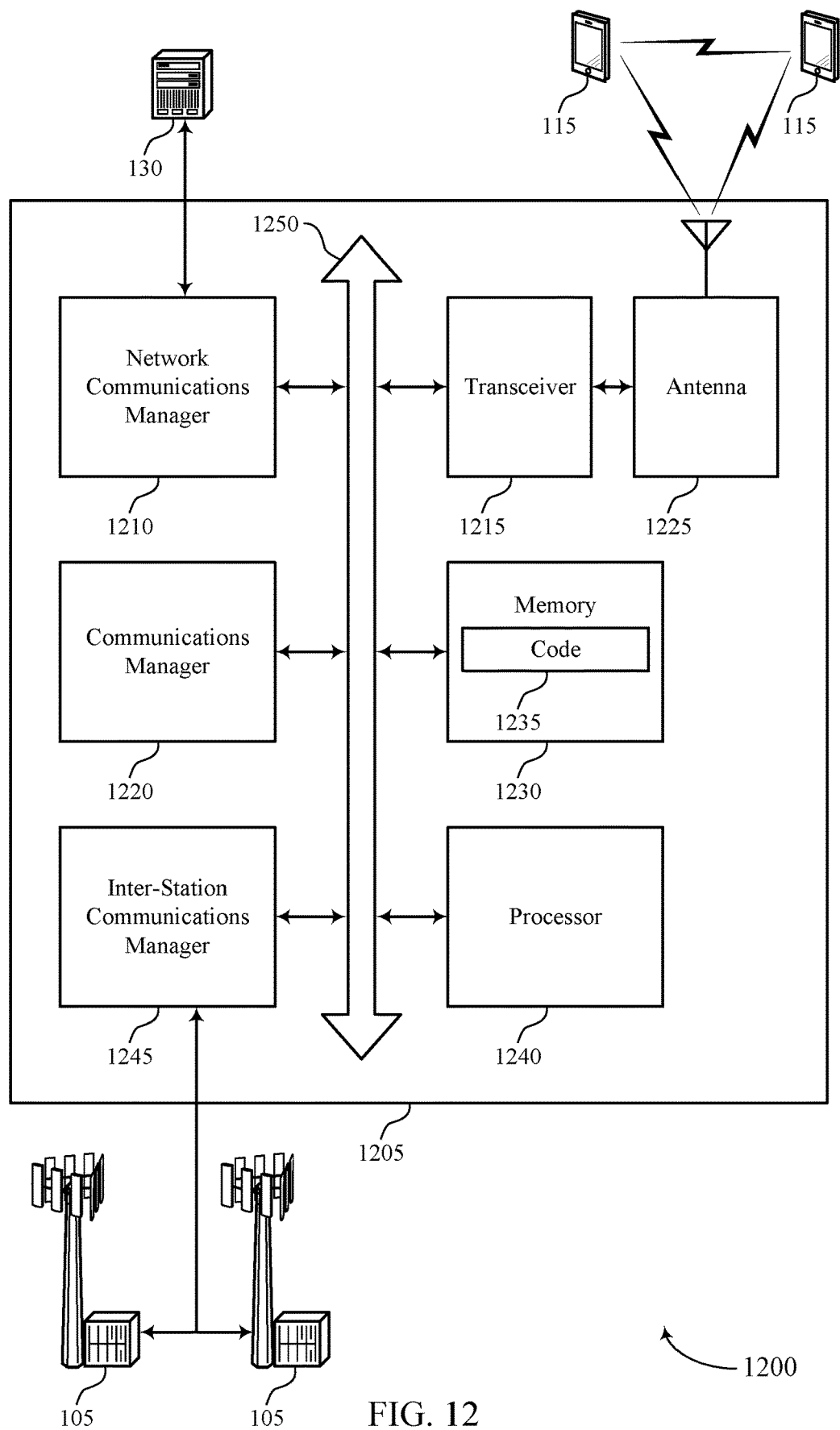
FIG. 12 shows a diagram of a system including a device that supports generation and transmission of measurement reports based on sensing capabilities in accordance with aspects of the present disclosure.

FIG. 12 shows a diagram of a system 1200 including a device 1205 that supports generation and transmission of measurement reports based on sensing capabilities in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting generation and transmission of measurement reports based on sensing capabilities). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a first UE, a first request for the first UE to provide sensing capability information associated with UEs other than the first UE. The communications manager 1220 may be configured as or otherwise support a means for receiving, from the first UE and responsive to the first request, an indication of the sensing capability information associated with one or more second UEs. The communications manager 1220 may be configured as or otherwise support a means for transmitting, to each of the one or more second UEs, a second request for the one or more second UEs to generate respective sensing measurement reports. The communications manager 1220 may be configured as or otherwise support a means for receiving, from the one or more second UEs and in accordance with the second request, the respective sensing measurement reports.

By including or configuring the communications manager 1220 in accordance with examples as described herein, the device 1205 may support techniques for reduced power consumption, improved coordination between devices, and longer battery life.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of generation and transmission of measurement reports based on sensing capabilities as described herein, or the processor 1240 and the memory 1230 may be otherwise configured to perform or support such operations.

Figure 13:
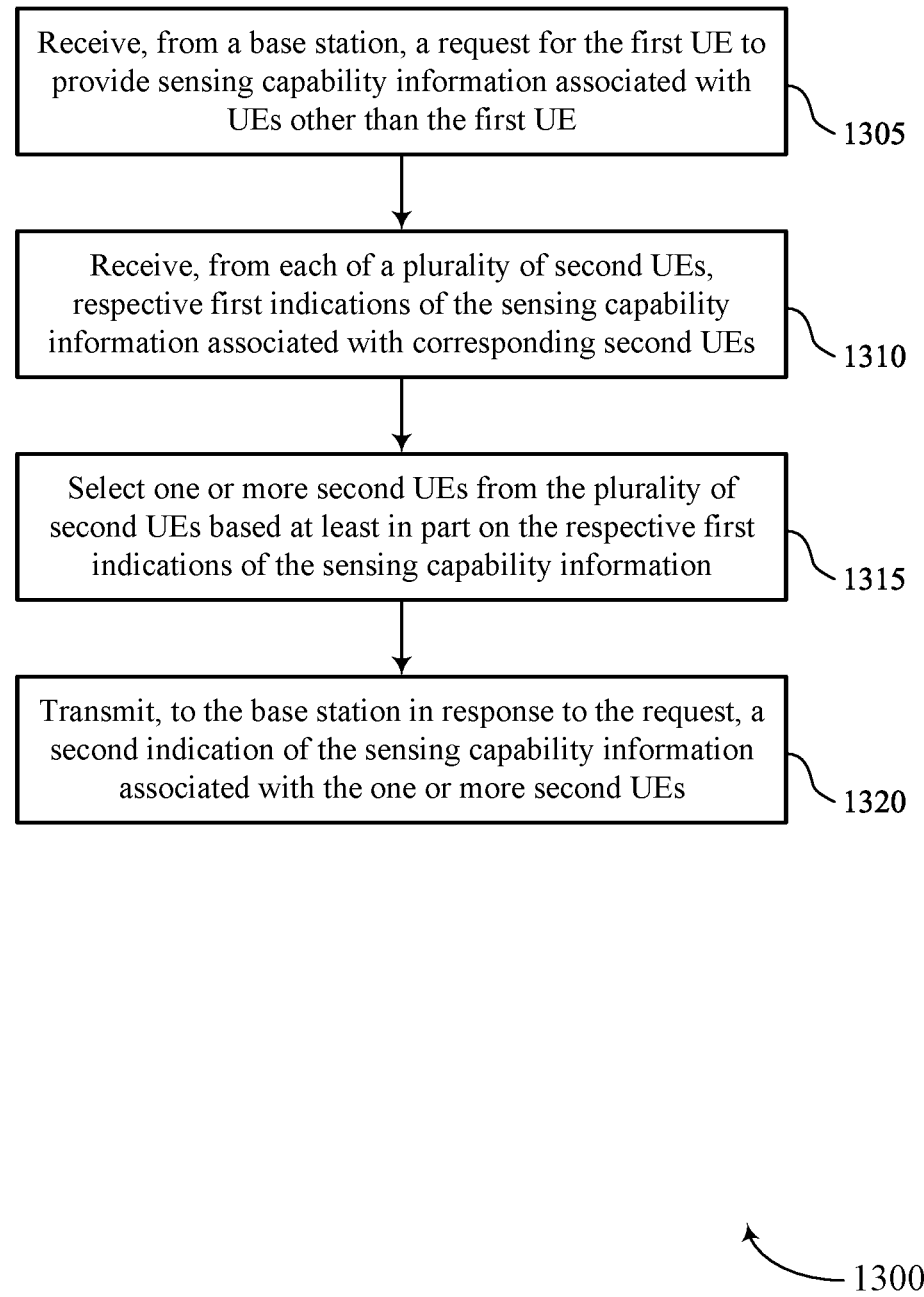
FIGS. 13 through 18 show flowcharts illustrating methods that support generation and transmission of measurement reports based on sensing capabilities in accordance with aspects of the present disclosure.

FIG. 13 shows a flowchart illustrating a method 1300 that supports generation and transmission of measurement reports based on sensing capabilities in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a request for the first UE to provide sensing capability information associated with UEs other than the first UE. The operations of 1305 may be performed in accordance with examples as disclosed herein. In some examples, aspects of the operations of 1305 may be performed by a request component 725 as described with reference to FIG. 7.

At 1310, the method may include receiving, from each of a set of multiple second UEs, respective first indications of the sensing capability information associated with corresponding second UEs. The operations of 1310 may be performed in accordance with examples as disclosed herein. In some examples, aspects of the operations of 1310 may be performed by a sensing capability component 730 as described with reference to FIG. 7.

At 1315, the method may include selecting one or more second UEs from the set of multiple second UEs based on the respective first indications of the sensing capability information. The operations of 1315 may be performed in accordance with examples as disclosed herein. In some examples, aspects of the operations of 1315 may be performed by a selecting component 735 as described with reference to FIG. 7.

At 1320, the method may include transmitting, to the base station in response to the request, a second indication of the sensing capability information associated with the one or more second UEs. The operations of 1320 may be performed in accordance with examples as disclosed herein. In some examples, aspects of the operations of 1320 may be performed by a response component 740 as described with reference to FIG. 7.

Figure 14:
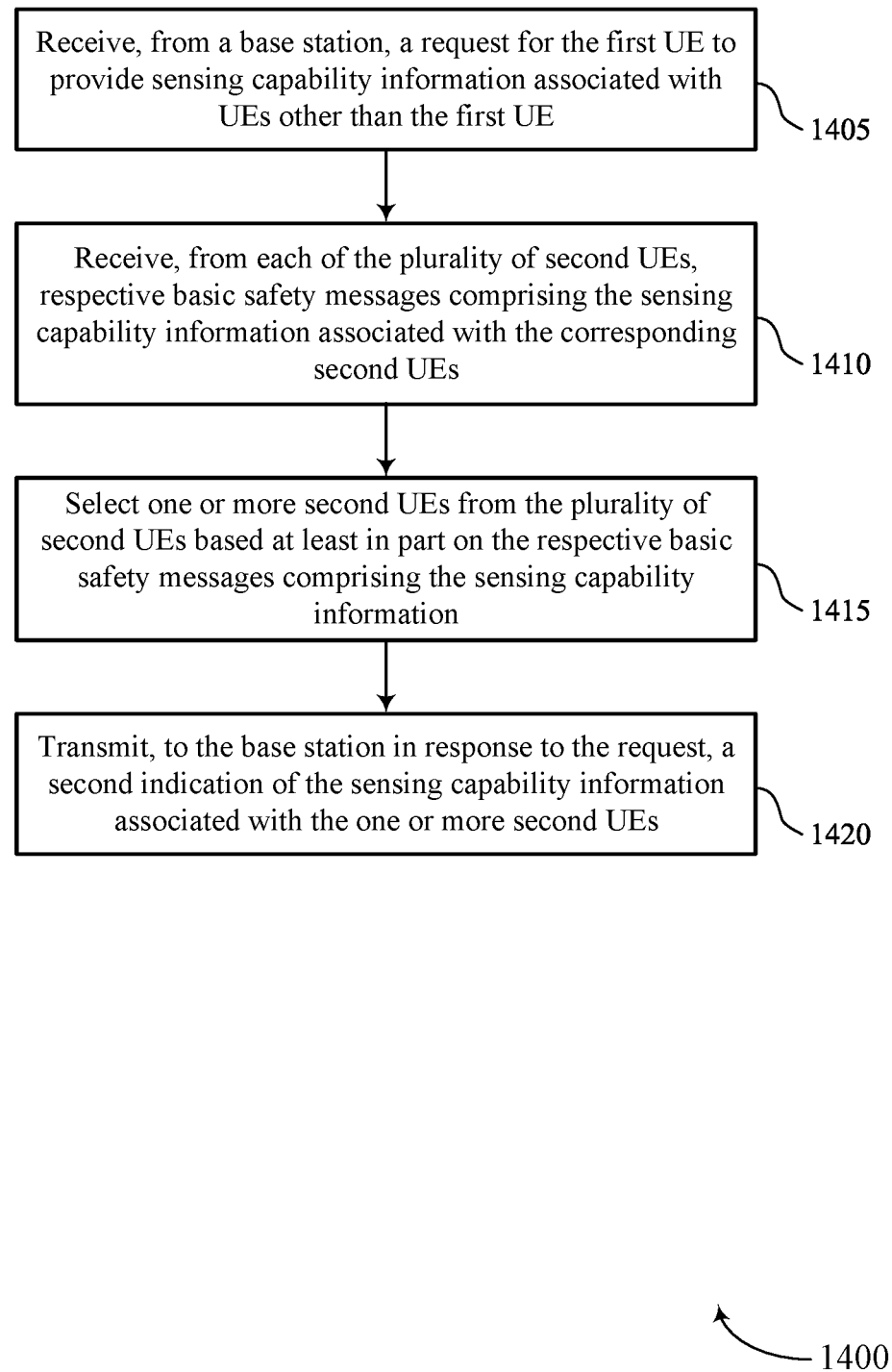

FIG. 14 shows a flowchart illustrating a method 1400 that supports generation and transmission of measurement reports based on sensing capabilities in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a request for the first UE to provide sensing capability information associated with UEs other than the first UE. The operations of 1405 may be performed in accordance with examples as disclosed herein. In some examples, aspects of the operations of 1405 may be performed by a request component 725 as described with reference to FIG. 7.

At 1410, the method may include receiving, from each of the set of multiple second UEs, respective BSMs including the sensing capability information associated with the corresponding second UEs. The operations of 1410 may be performed in accordance with examples as disclosed herein. In some examples, aspects of the operations of 1410 may be performed by a sensing capability component 730 as described with reference to FIG. 7.

At 1415, the method may include selecting one or more second UEs from the set of multiple second UEs based on the respective BSMs comprising the sensing capability information. The operations of 1415 may be performed in accordance with examples as disclosed herein. In some examples, aspects of the operations of 1415 may be performed by a selecting component 735 as described with reference to FIG. 7.

At 1420, the method may include transmitting, to the base station in response to the request, a second indication of the sensing capability information associated with the one or more second UEs. The operations of 1420 may be performed in accordance with examples as disclosed herein. In some examples, aspects of the operations of 1420 may be performed by a response component 740 as described with reference to FIG. 7.

Figure 15:
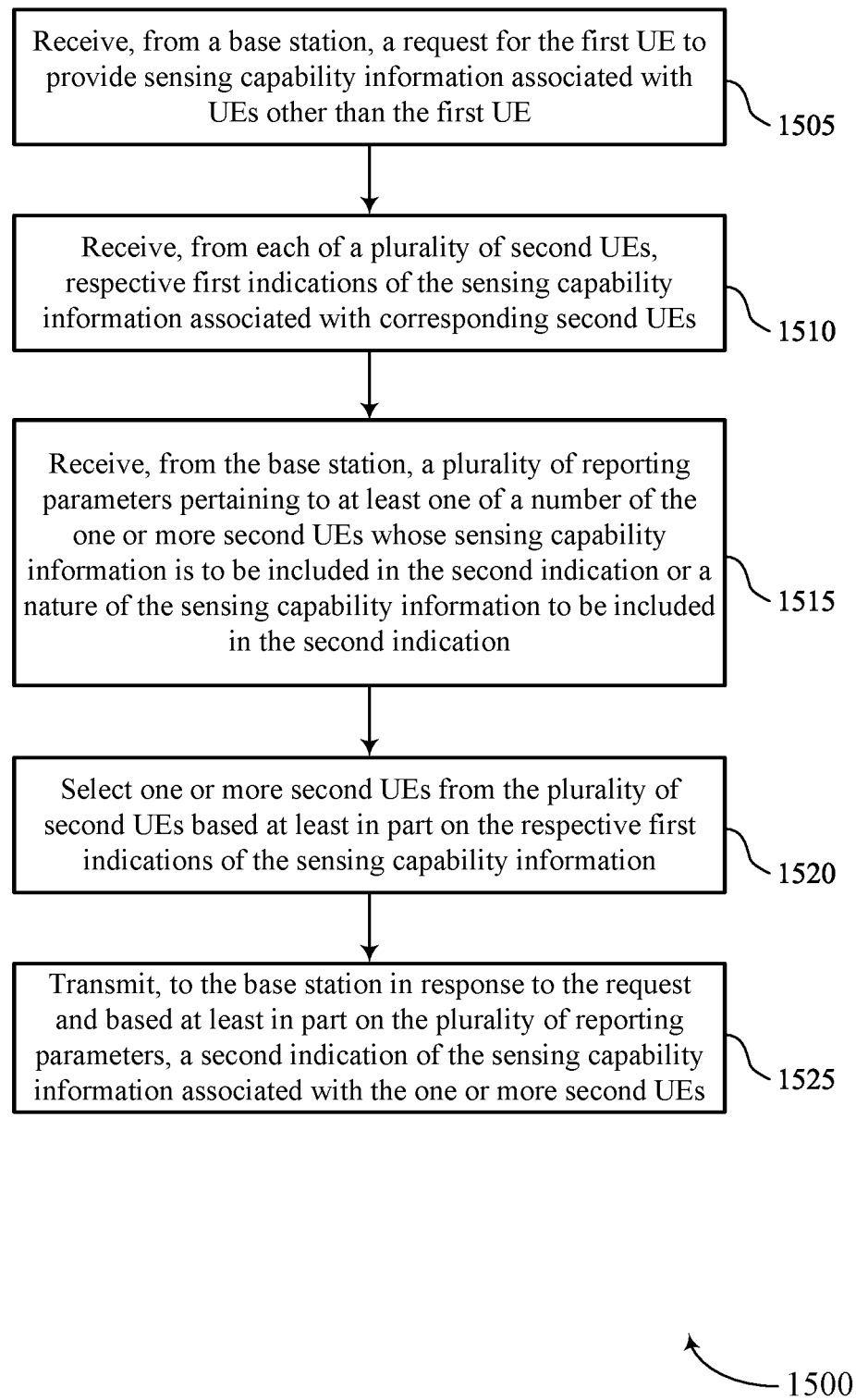

FIG. 15 shows a flowchart illustrating a method 1500 that supports generation and transmission of measurement reports based on sensing capabilities in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a request for the first UE to provide sensing capability information associated with UEs other than the first UE. The operations of 1505 may be performed in accordance with examples as disclosed herein. In some examples, aspects of the operations of 1505 may be performed by a request component 725 as described with reference to FIG. 7.

At 1510, the method may include receiving, from each of a set of multiple second UEs, respective first indications of the sensing capability information associated with corresponding second UEs. The operations of 1510 may be performed in accordance with examples as disclosed herein. In some examples, aspects of the operations of 1510 may be performed by a sensing capability component 730 as described with reference to FIG. 7.

At 1515, the method may include receiving, from the base station, a set of multiple reporting parameters pertaining to at least one of a number of the one or more second UEs whose sensing capability information is to be included in the second indication or a nature of the sensing capability information to be included in the second indication. The operations of 1515 may be performed in accordance with examples as disclosed herein. In some examples, aspects of the operations of 1515 may be performed by a parameters component 745 as described with reference to FIG. 7.

At 1520, the method may include selecting one or more second UEs from the set of multiple second UEs based on the respective first indications of the sensing capability information. The operations of 1520 may be performed in accordance with examples as disclosed herein. In some examples, aspects of the operations of 1520 may be performed by a selecting component 735 as described with reference to FIG. 7.

At 1525, the method may include transmitting, to the base station in response to the request and based at least in part on the plurality of reporting parameters, a second indication of the sensing capability information associated with the one or more second UEs. The operations of 1525 may be performed in accordance with examples as disclosed herein. In some examples, aspects of the operations of 1525 may be performed by a response component 740 as described with reference to FIG. 7.

Figure 16:
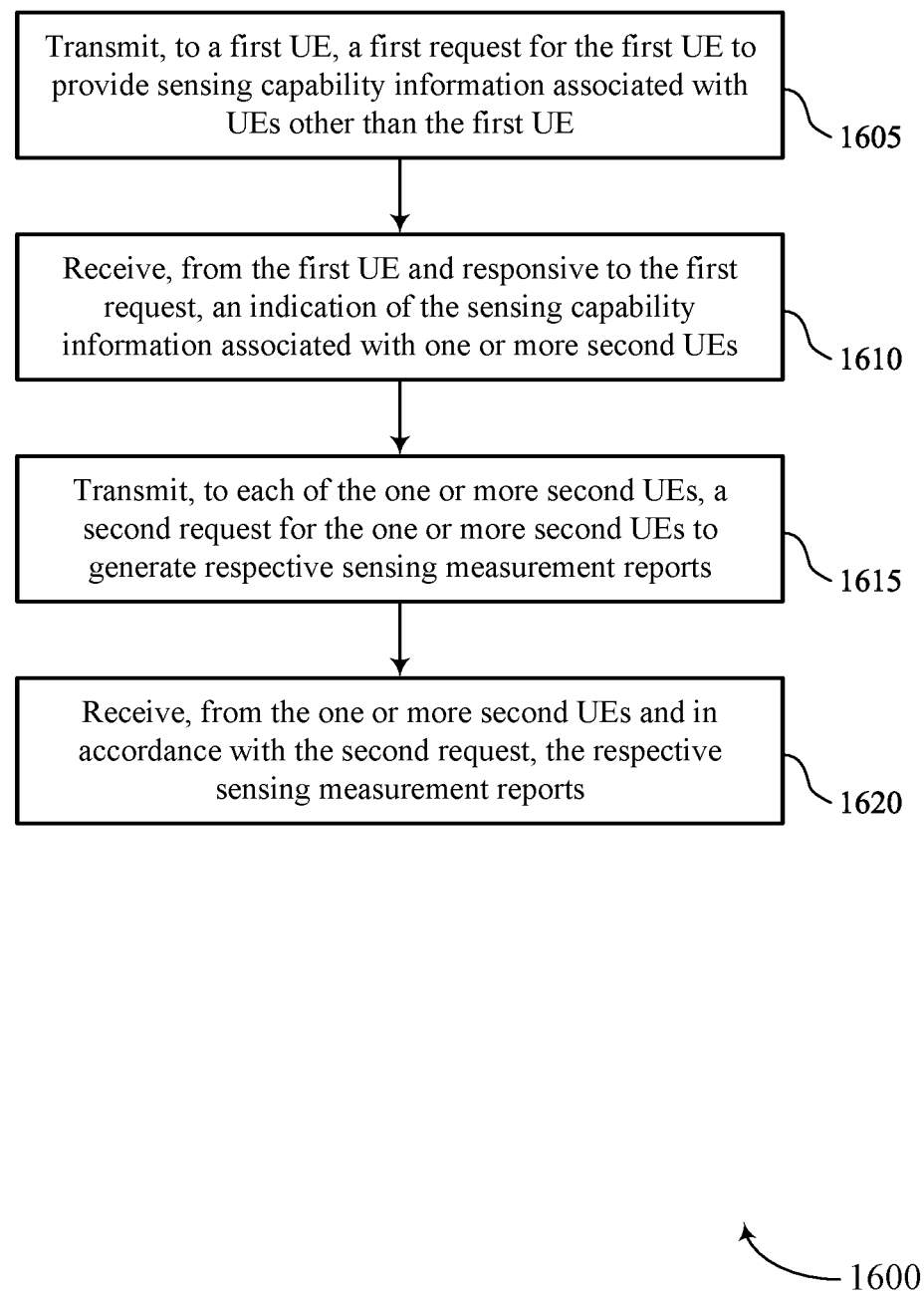

FIG. 16 shows a flowchart illustrating a method 1600 that supports generation and transmission of measurement reports based on sensing capabilities in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a first UE, a first request for the first UE to provide sensing capability information associated with UEs other than the first UE. The operations of 1605 may be performed in accordance with examples as disclosed herein. In some examples, aspects of the operations of 1605 may be performed by a capability request transmitter 1125 as described with reference to FIG. 11.

At 1610, the method may include receiving, from the first UE and responsive to the first request, an indication of the sensing capability information associated with one or more second UEs. The operations of 1610 may be performed in accordance with examples as disclosed herein. In some examples, aspects of the operations of 1610 may be performed by a capability information receiver 1130 as described with reference to FIG. 11.

At 1615, the method may include transmitting, to each of the one or more second UEs, a second request for the one or more second UEs to generate respective sensing measurement reports. The operations of 1615 may be performed in accordance with examples as disclosed herein. In some examples, aspects of the operations of 1615 may be performed by a measurement report manager 1135 as described with reference to FIG. 11.

At 1620, the method may include receiving, from the one or more second UEs and in accordance with the second request, the respective sensing measurement reports. The operations of 1620 may be performed in accordance with examples as disclosed herein. In some examples, aspects of the operations of 1620 may be performed by a measurement report receiver 1140 as described with reference to FIG. 11.

Figure 17:
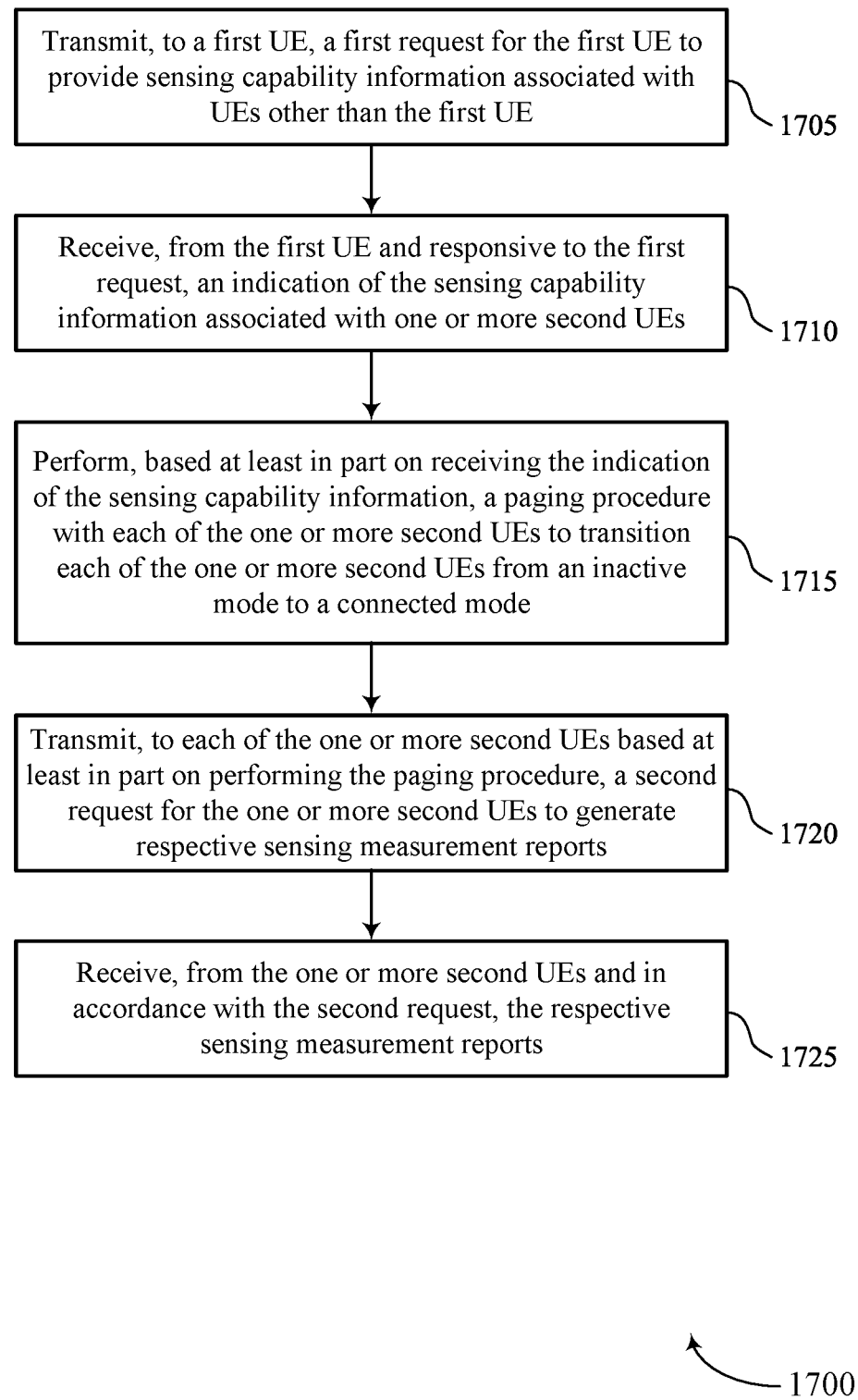

FIG. 17 shows a flowchart illustrating a method 1700 that supports generation and transmission of measurement reports based on sensing capabilities in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a first UE, a first request for the first UE to provide sensing capability information associated with UEs other than the first UE. The operations of 1705 may be performed in accordance with examples as disclosed herein. In some examples, aspects of the operations of 1705 may be performed by a capability request transmitter 1125 as described with reference to FIG. 11.

At 1710, the method may include receiving, from the first UE and responsive to the first request, an indication of the sensing capability information associated with one or more second UEs. The operations of 1710 may be performed in accordance with examples as disclosed herein. In some examples, aspects of the operations of 1710 may be performed by a capability information receiver 1130 as described with reference to FIG. 11.

At 1715, the method may include performing, based on receiving the indication of the sensing capability information, a paging procedure with each of the one or more second UEs to transition each of the one or more second UEs from an inactive mode to a connected mode. The operations of 1715 may be performed in accordance with examples as disclosed herein. In some examples, aspects of the operations of 1715 may be performed by a paging component 1145 as described with reference to FIG. 11.

At 1720, the method may include transmitting, to each of the one or more second UEs based at least in part on performing the paging procedure, a second request for the one or more second UEs to generate respective sensing measurement reports. The operations of 1720 may be performed in accordance with examples as disclosed herein. In some examples, aspects of the operations of 1720 may be performed by a measurement report manager 1135 as described with reference to FIG. 11.

At 1725, the method may include receiving, from the one or more second UEs and in accordance with the second request, the respective sensing measurement reports. The operations of 1725 may be performed in accordance with examples as disclosed herein. In some examples, aspects of the operations of 1725 may be performed by a measurement report receiver 1140 as described with reference to FIG. 11.

Figure 18:
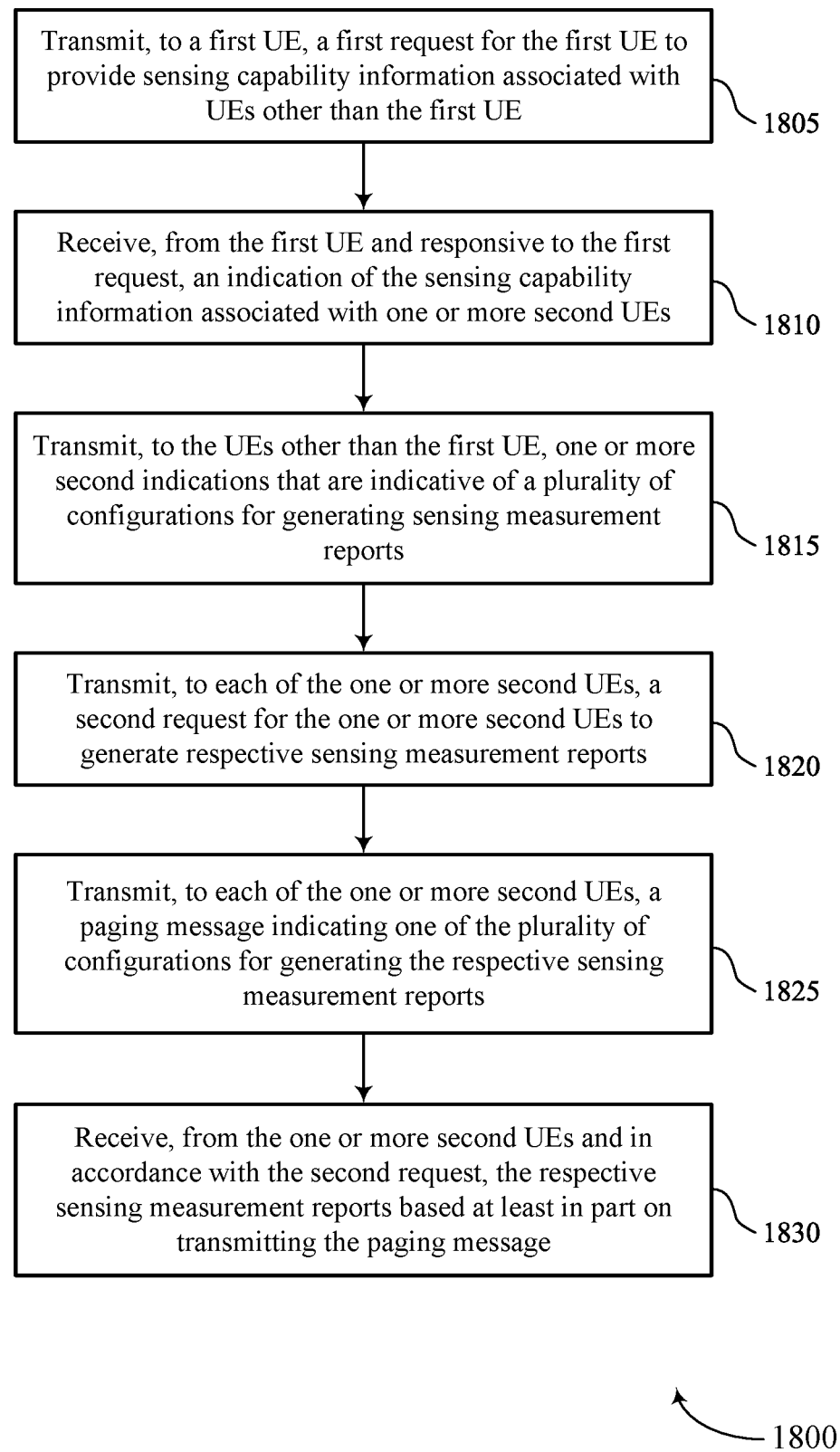

FIG. 18 shows a flowchart illustrating a method 1800 that supports generation and transmission of measurement reports based on sensing capabilities in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a first UE, a first request for the first UE to provide sensing capability information associated with UEs other than the first UE. The operations of 1805 may be performed in accordance with examples as disclosed herein. In some examples, aspects of the operations of 1805 may be performed by a capability request transmitter 1125 as described with reference to FIG. 11.

At 1810, the method may include receiving, from the first UE and responsive to the first request, an indication of the sensing capability information associated with one or more second UEs. The operations of 1810 may be performed in accordance with examples as disclosed herein. In some examples, aspects of the operations of 1810 may be performed by a capability information receiver 1130 as described with reference to FIG. 11.

At 1815, the method may include transmitting, to the UEs other than the first UE, one or more second indications that are indicative of a set of multiple configurations for generating sensing measurement reports. The operations of 1815 may be performed in accordance with examples as disclosed herein. In some examples, aspects of the operations of 1815 may be performed by a configuration manager 1150 as described with reference to FIG. 11.

At 1820, the method may include transmitting, to each of the one or more second UEs, a second request for the one or more second UEs to generate respective sensing measurement reports. The operations of 1820 may be performed in accordance with examples as disclosed herein. In some examples, aspects of the operations of 1820 may be performed by a measurement report manager 1135 as described with reference to FIG. 11.

At 1825, the method may include transmitting, to each of the one or more second UEs, a paging message indicating one of the set of multiple configurations for generating the respective sensing measurement reports. The operations of 1825 may be performed in accordance with examples as disclosed herein. In some examples, aspects of the operations of 1825 may be performed by a paging component 1145 as described with reference to FIG. 11.

At 1830, the method may include receiving, from the one or more second UEs and in accordance with the second request, the respective sensing measurement reports based at least in part on transmitting the paging message. The operations of 1830 may be performed in accordance with examples as disclosed herein. In some examples, aspects of the operations of 1830 may be performed by a measurement report receiver 1140 as described with reference to FIG. 11.

The following provides an overview of aspects of the present disclosure:

Aspect 1: A method for wireless communication at a first UE, comprising: receiving, from a base station, a request for the first UE to provide sensing capability information associated with UEs other than the first UE; receiving, from each of a plurality of second UEs, respective first indications of the sensing capability information associated with corresponding second UEs; selecting one or more second UEs from the plurality of second UEs based at least in part on the respective first indications of the sensing capability information; and transmitting, to the base station in response to the request, a second indication of the sensing capability information associated with the one or more second UEs.

Aspect 2: The method of aspect 1, wherein receiving the respective first indications of the sensing capability information comprises: receiving, from each of the plurality of second UEs, respective basic safety messages comprising the sensing capability information associated with the corresponding second UEs.

Aspect 3: The method of any of aspects 1 through 2, further comprising: receiving, from the base station, a plurality of reporting parameters pertaining to at least one of a number of the one or more second UEs whose sensing capability information is to be included in the second indication or a nature of the sensing capability information to be included in the second indication, wherein transmitting the second indication is based at least in part on the plurality of reporting parameters.

Aspect 4: The method of aspect 3, wherein values of the plurality of reporting parameters are based at least in part on a geographical zone of the first UE, a mobility of the first UE, or a combination thereof.

Aspect 5: The method of any of aspects 3 through 4, wherein receiving the plurality of reporting parameters further comprises: receiving one or more of the plurality of reporting parameters that pertain to the nature of the sensing capability information to be included in the second indication and which specify that the nature of the sensing capability information is at least one of raw information, meta information, information of a specified resolution quality, images, or point clouds.

Aspect 6: The method of any of aspects 1 through 5, wherein selecting the one or more second UEs comprises: selecting the one or more second UEs from the plurality of second UEs based at least in part on the one or more second UEs being associated with a sensing capability.

Aspect 7: The method of any of aspects 1 through 6, further comprising: receiving, from the base station based at least in part on transmitting the second indication, a third indication to switch from a first beam for communications between the base station and the first UE to a second beam for the communications between the base station and the first UE.

Aspect 8: The method of any of aspects 1 through 7, WHEREIN transmitting the second indication comprises: transmitting a shortened-temporary mobile subscriber identity associated with the one or more second UEs, a sidelink layer-2 identifier associated with the one or more second UEs, or a combination thereof.

Aspect 9: The method of any of aspects 1 through 8, wherein the sensing capability information comprises an indication of one or more sensors associated with the corresponding second UEs, an orientation of the corresponding second UEs, a field of view associated with the corresponding second UEs, or a combination thereof.

Aspect 10: A method for wireless communication at a base station, comprising: transmitting, to a first UE, a first request for the first UE to provide sensing capability information associated with UEs other than the first UE; receiving, from the first UE and responsive to the first request, an indication of the sensing capability information associated with one or more second UEs; transmitting, to each of the one or more second UEs, a second request for the one or more second UEs to generate respective sensing measurement reports; and receiving, from the one or more second UEs and in accordance with the second request, the respective sensing measurement reports.

Aspect 11: The method of aspect 10, further comprising: performing, based at least in part on receiving the indication of the sensing capability information, a paging procedure with each of the one or more second UEs to transition each of the one or more second UEs from an inactive mode to a connected mode, wherein transmitting the second request to each of the one or more second UEs is based at least in part on performing the paging procedure.

Aspect 12: The method of aspect 11, further comprising: transmitting, to each of the one or more second UEs, a paging message comprising a shortened-temporary mobile subscriber identity associated with respective one or more second UEs or an identifier associated with the respective one or more second UEs determined based at least in part on a mapping between sidelinks and communication links between the base station and the respective one or more second UEs.

Aspect 13: The method of any of aspects 11 through 12, further comprising: transmitting, to a mobility management entity, a third request to initiate the paging procedure with each of the one or more second UEs, wherein performing the paging procedure is based at least in part on transmitting the third request.

Aspect 14: The method of any of aspects 10 through 13, further comprising: transmitting, to the UEs other than the first UE, one or more second indications that are indicative of a plurality of configurations for generating sensing measurement reports; and transmitting, to each of the one or more second UEs, a paging message indicating one of the plurality of configurations for generating the respective sensing measurement reports, wherein receiving the respective sensing measurement reports is based at least in part on transmitting the paging message.

Aspect 15: The method of aspect 14, further comprising: identifying the one of the plurality of configurations for generating the respective sensing measurement reports based at least in part on a mobility of the first UE.

Aspect 16: The method of any of aspects 10 through 15, wherein transmitting the first request for the first UE to provide sensing capability information is based at least in part on a mobility of the first UE.

Aspect 17: The method of any of aspects 10 through 16, further comprising: transmitting, to the first UE, a plurality of reporting parameters pertaining to at least one of a number of the one or more second UEs whose sensing capability information is to be included in the indication or a nature of the sensing capability information to be included in the indication, wherein receiving the indication is based at least in part on transmitting the plurality of reporting parameters.

Aspect 18: The method of aspect 17, wherein values of the plurality of reporting parameters are based at least in part on a geographical zone of the first UE, a mobility of the first UE, or a combination thereof.

Aspect 19: The method of any of aspects 17 through 18, wherein transmitting the plurality of reporting parameters further comprises: transmitting one or more of the plurality of reporting parameters that pertain to the nature of the sensing capability information to be included in the indication and which specify that the nature of the sensing capability information is at least one of raw information, meta information, information of a specified resolution quality, images, or point clouds.

Aspect 20: The method of any of aspects 10 through 19, wherein the sensing capability information comprises a second indication of one or more sensors associated with the one or more second UEs, an orientation of the one or more second UEs, a field of view associated with the one or more second UEs, or a combination thereof.

Aspect 21: The method of any of aspects 10 through 20, further comprising: transmitting, to the first UE based at least in part on receiving the respective sensing measurement reports, a second indication to switch from a first beam for communications between the base station and the first UE to a second beam for the communications between the base station and the first UE.

Aspect 22: The method of any of aspects 10 through 21, wherein receiving the indication comprises: receiving a shortened-temporary mobile subscriber identity associated with the one or more second UEs, a sidelink layer-2 identifier associated with the one or more second UEs, or a combination thereof.

Aspect 23: An apparatus for wireless communication at a first UE, comprising a processor; memory coupled with the processor; and instructions stored in the memory and executable by the processor to cause the apparatus to perform a method of any of aspects 1 through 9.

Aspect 24: An apparatus for wireless communication at a first UE, comprising at least one means for performing a method of any of aspects 1 through 9.

Aspect 25: A non-transitory computer-readable medium storing code for wireless communication at a first UE, the code comprising instructions executable by a processor to perform a method of any of aspects 1 through 9.

Aspect 26: An apparatus for wireless communication at a base station, comprising a processor; memory coupled with the processor; and instructions stored in the memory and executable by the processor to cause the apparatus to perform a method of any of aspects 10 through 22.

Aspect 27: An apparatus for wireless communication at a base station, comprising at least one means for performing a method of any of aspects 10 through 22.

Aspect 28: A non-transitory computer-readable medium storing code for wireless communication at a base station, the code comprising instructions executable by a processor to perform a method of any of aspects 10 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving, from a base station, a request for the first UE to provide sensing capability information associated with a plurality of second UEs, wherein the plurality of the second UEs are different from the first UE;
   receiving, from each of the plurality of second UEs, respective first indications of sensing capability information associated with corresponding second UEs;
   selecting one or more second UEs from the plurality of second UEs based at least in part on the respective first indications of the sensing capability information associated with corresponding second UEs; and
   transmitting, to the base station in response to the request, a second indication of the sensing capability information associated with the one or more second UEs.

2. The method of claim 1, wherein receiving the respective first indications of the sensing capability information associated with corresponding second UEs comprises:
   receiving, from each of the plurality of second UEs, respective basic safety messages comprising the sensing capability information associated with the corresponding second UEs.

3. The method of claim 1, further comprising:
   receiving, from the base station, a plurality of reporting parameters pertaining to at least one of a number of the one or more second UEs whose sensing capability information is to be included in the second indication or a nature of the sensing capability information to be included in the second indication, wherein transmitting the second indication is based at least in part on the plurality of reporting parameters.

4. The method of claim 3, wherein values of the plurality of reporting parameters are based at least in part on a geographical zone of the first UE, a mobility of the first UE, or a combination thereof.

5. The method of claim 3, wherein receiving the plurality of reporting parameters further comprises:
   receiving one or more of the plurality of reporting parameters that pertain to the nature of the sensing capability information to be included in the second indication and which specify that the nature of the sensing capability information is at least one of raw information, meta information, information of a specified resolution quality, images, or point clouds.

6. The method of claim 1, wherein selecting the one or more second UEs comprises:
   selecting the one or more second UEs from the plurality of second UEs based at least in part on the one or more second UEs being associated with a sensing capability.

7. The method of claim 1, further comprising:
   receiving, from the base station based at least in part on transmitting the second indication, a third indication to switch from a first beam for communications between the base station and the first UE to a second beam for the communications between the base station and the first UE.

8. The method of claim 1, wherein transmitting the second indication comprises:
transmitting a shortened-temporary mobile subscriber identity associated with the one or more second UEs, a sidelink layer-2 identifier associated with the one or more second UEs, or a combination thereof.

9. The method of claim 1, wherein the sensing capability information associated with corresponding second UEs comprises an indication of one or more sensors associated with the corresponding second UEs, an orientation of the corresponding second UEs, a field of view associated with the corresponding second UEs, or a combination thereof.

10. A method for wireless communication at a base station, comprising:
transmitting, to a first user equipment (UE), a first request for the first UE to provide sensing capability information associated with a plurality of second UEs, wherein the plurality of the second UEs are different from the first UE;
receiving, from the first UE and responsive to the first request, an indication of sensing capability information associated with one or more second UEs;
transmitting, to each of the one or more second UEs, a second request for the one or more second UEs to generate respective sensing measurement reports; and
receiving, from the one or more second UEs and in accordance with the second request, the respective sensing measurement reports.

11. The method of claim 10, further comprising:
performing, based at least in part on receiving the indication of the sensing capability information, a paging procedure with each of the one or more second UEs to transition each of the one or more second UEs from an inactive mode to a connected mode, wherein transmitting the second request to each of the one or more second UEs is based at least in part on performing the paging procedure.

12. The method of claim 11, further comprising:
transmitting, to each of the one or more second UEs, a paging message comprising a shortened-temporary mobile subscriber identity associated with respective one or more second UEs or an identifier associated with the respective one or more second UEs determined based at least in part on a mapping between sidelinks and communication links between the base station and the respective one or more second UEs.

13. The method of claim 11, further comprising:
transmitting, to a mobility management entity, a third request to initiate the paging procedure with each of the one or more second UEs, wherein performing the paging procedure is based at least in part on transmitting the third request.

14. The method of claim 10, further comprising:
transmitting, to each of the one or more second UEs, one or more second indications that are indicative of a plurality of configurations for generating sensing measurement reports; and
transmitting, to each of the one or more second UEs, a paging message indicating one of the plurality of configurations for generating the respective sensing measurement reports, wherein receiving the respective sensing measurement reports is based at least in part on transmitting the paging message.

15. The method of claim 14, further comprising:
identifying the one of the plurality of configurations for generating the respective sensing measurement reports based at least in part on a mobility of the first UE.

16. The method of claim 10, wherein transmitting the first request for the first UE to provide sensing capability information is based at least in part on a mobility of the first UE.

17. The method of claim 10, further comprising:
transmitting, to the first UE, a plurality of reporting parameters pertaining to at least one of a number of the one or more second UEs whose sensing capability information is to be included in the indication or a nature of the sensing capability information to be included in the indication, wherein receiving the indication is based at least in part on transmitting the plurality of reporting parameters.

18. The method of claim 17, wherein values of the plurality of reporting parameters are based at least in part on a geographical zone of the first UE, a mobility of the first UE, or a combination thereof.

19. The method of claim 17, wherein transmitting the plurality of reporting parameters further comprises:
transmitting one or more of the plurality of reporting parameters that pertain to the nature of the sensing capability information to be included in the indication and which specify that the nature of the sensing capability information is at least one of raw information, meta information, information of a specified resolution quality, images, or point clouds.

20. The method of claim 10, wherein the sensing capability information associated with the one or more second UEs comprises a second indication of one or more sensors associated with the one or more second UEs, an orientation of the one or more second UEs, a field of view associated with the one or more second UEs, or a combination thereof.

21. The method of claim 10, further comprising:
transmitting, to the first UE based at least in part on receiving the respective sensing measurement reports, a second indication to switch from a first beam for communications between the base station and the first UE to a second beam for the communications between the base station and the first UE.

22. The method of claim 10, wherein receiving the indication comprises:
receiving a shortened-temporary mobile subscriber identity associated with the one or more second UEs, a sidelink layer-2 identifier associated with the one or more second UEs, or a combination thereof.

23. An apparatus for wireless communication at a first user equipment (UE), comprising:
a processor;
memory coupled with the processor; and
instructions stored in the memory and executable by the processor to cause the apparatus to:
receive, from a base station, a request for the first UE to provide sensing capability information associated with a plurality of second UEs, wherein the plurality of the second UEs are different from the first UE;
receive, from each of the plurality of second UEs, respective first indications of sensing capability information associated with corresponding second UEs;
select one or more second UEs from the plurality of second UEs based at least in part on the respective first indications of the sensing capability information associated with corresponding second UEs; and
transmit, to the base station in response to the request, a second indication of the sensing capability information associated with the one or more second UEs.

24. The apparatus of claim 23, wherein the instructions to receive the respective first indications of the sensing capability information associated with corresponding second UEs are executable by the processor to cause the apparatus to:
- receive, from each of the plurality of second UEs, respective basic safety messages comprising the sensing capability information associated with the corresponding second UEs.

25. The apparatus of claim 23, wherein the instructions are further executable by the processor to cause the apparatus to:
- receive, from the base station, a plurality of reporting parameters pertaining to at least one of a number of the one or more second UEs whose sensing capability information is to be included in the second indication or a nature of the sensing capability information to be included in the second indication, wherein transmitting the second indication is based at least in part on the plurality of reporting parameters.

26. The apparatus of claim 23, wherein the instructions to select the one or more second UEs are executable by the processor to cause the apparatus to:
- select the one or more second UEs from the plurality of second UEs based at least in part on the one or more second UEs being associated with a sensing capability.

27. An apparatus for wireless communication at a base station, comprising:
- a processor;
- memory coupled with the processor; and
- instructions stored in the memory and executable by the processor to cause the apparatus to:
  - transmit, to a first user equipment (UE), a first request for the first UE to provide sensing capability information associated with a plurality of second UEs, wherein the plurality of the second UEs are different from the first UE;
  - receive, from the first UE and responsive to the first request, an indication of sensing capability information associated with one or more second UEs;
  - transmit, to each of the one or more second UEs, a second request for the one or more second UEs to generate respective sensing measurement reports; and
  - receive, from the one or more second UEs and in accordance with the second request, the respective sensing measurement reports.

28. The apparatus of claim 27, wherein the instructions are further executable by the processor to cause the apparatus to:
- perform, based at least in part on receiving the indication of the sensing capability information, a paging procedure with each of the one or more second UEs to transition each of the one or more second UEs from an inactive mode to a connected mode, wherein transmitting the second request to each of the one or more second UEs is based at least in part on performing the paging procedure.

29. The apparatus of claim 27, wherein the instructions are further executable by the processor to cause the apparatus to:
- transmit, to each of the one or more second UEs, one or more second indications that are indicative of a plurality of configurations for generating sensing measurement reports; and
- transmit, to each of the one or more second UEs, a paging message indicating one of the plurality of configurations for generating the respective sensing measurement reports, wherein receiving the respective sensing measurement reports is based at least in part on transmitting the paging message.

30. The apparatus of claim 29, wherein the instructions are further executable by the processor to cause the apparatus to:
- identify the one of the plurality of configurations for generating the respective sensing measurement reports based at least in part on a mobility of the first UE.

* * * * *